(12) United States Patent
Kim et al.

(10) Patent No.: US 12,139,838 B2
(45) Date of Patent: Nov. 12, 2024

(54) APPARATUS FOR TREATING LAUNDRY

(71) Applicant: LG Electronics Inc., Seoul (KR)

(72) Inventors: Hyeonjoong Kim, Seoul (KR); Hongjun Cho, Seoul (KR); Hyojun Kim, Seoul (KR); Oshin Kwon, Seoul (KR); Yangguk Hwang, Seoul (KR); Hyuksoo Lee, Seoul (KR); Yeonju Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 262 days.

(21) Appl. No.: 17/466,849

(22) Filed: Sep. 3, 2021

(65) Prior Publication Data

US 2022/0074109 A1 Mar. 10, 2022

(30) Foreign Application Priority Data

Sep. 4, 2020 (KR) .................. 10-2020-0113075
Sep. 4, 2020 (KR) .................. 10-2020-0113077
Sep. 4, 2020 (KR) .................. 10-2020-0113078

(51) Int. Cl.
*D06F 37/30* (2020.01)
*D06F 37/04* (2006.01)
(Continued)

(52) U.S. Cl.
CPC .......... *D06F 37/304* (2013.01); *D06F 37/04* (2013.01); *D06F 58/02* (2013.01); *D06F 58/08* (2013.01);
(Continued)

(58) Field of Classification Search
None
See application file for complete search history.

(56) References Cited

U.S. PATENT DOCUMENTS 2,975,528 A 3/1961 Shewmon
3,060,593 A 10/1962 Flora et al.
(Continued)

FOREIGN PATENT DOCUMENTS

CN 1563742 1/2005
CN 101124360 2/2008
(Continued)

OTHER PUBLICATIONS

Office Action in Korean Appln. No. 10-2020-0113077, dated Oct. 24, 2023, 14 pages (with English translation).
(Continued)

*Primary Examiner* — Rita P Adhlakha
(74) *Attorney, Agent, or Firm* — Fish & Richardson P.C.

(57) ABSTRACT

A laundry treating apparatus includes a drum body, a front cover, a rear cover, a fixed panel spaced apart from the rear cover, a housing fixed to the fixed panel, a stator, a rotor, a ring gear fixed in the housing, a first shaft fixed to the rotor and located in the housing, a driver gear located within the housing and fixed to the first shaft, a second shaft that is concentric with the first shaft, fixed to the rear cover, and located within the housing, a base located within the housing and coupled to the second shaft, and a driven gear having a first body rotatably fixed to the base, a first gear defined at the first body and engaged with the driver gear, a second body fixed to the first body, and a second gear defined at the second body and engaged with the ring gear.

15 Claims, 13 Drawing Sheets

(51) Int. Cl.
  *D06F 58/02* (2006.01)
  *D06F 58/08* (2006.01)
  *D06F 58/20* (2006.01)
  *H02K 1/27* (2022.01)
  *H02K 7/14* (2006.01)
  *H02K 9/02* (2006.01)

(52) U.S. Cl.
  CPC ............ *D06F 58/20* (2013.01); *D06F 58/206* (2013.01); *H02K 1/27* (2013.01); *H02K 7/14* (2013.01); *H02K 9/02* (2013.01)

(56) References Cited

U.S. PATENT DOCUMENTS

| | | | |
|---|---|---|---|
| 4,407,078 | A | 10/1983 | Takeyama et al. |
| 2004/0031295 | A1 | 2/2004 | Choi |
| 2012/0299406 | A1 | 11/2012 | Hong et al. |
| 2021/0404107 | A1 | 12/2021 | Bae et al. |

FOREIGN PATENT DOCUMENTS

| | | |
|---|---|---|
| CN | 201254659 | 6/2009 |
| CN | 110396808 | 11/2019 |
| EP | 1997950 | 12/2008 |
| EP | 2990519 | 3/2016 |
| EP | 2990521 | 3/2016 |
| GB | 2004422 | 3/1979 |
| JP | S55163084 | 12/1980 |
| JP | S576698 | 1/1982 |
| JP | S59-14888 | 1/1984 |
| JP | S60-242898 | 12/1985 |
| JP | 2004-513722 | 5/2004 |
| JP | 2006-230471 | 9/2006 |
| JP | 2007-082834 | 4/2007 |
| JP | 2011-200545 | 10/2011 |
| JP | 2012-081159 | 4/2012 |
| JP | 2014-100575 | 6/2014 |
| JP | 2015-208571 | 11/2015 |
| JP | 2016-005494 | 1/2016 |
| JP | 2017-104500 | 6/2017 |
| JP | 2019-097580 | 6/2019 |
| KR | 10-2002-0038303 | 5/2002 |
| KR | 20020032181 | 5/2002 |
| KR | 100607266 | 7/2006 |
| KR | 10-2007-0101383 | 10/2007 |
| KR | 10-2011-0089987 A | 8/2011 |
| KR | 20150118859 | 10/2015 |
| KR | 10-2018-0037882 A | 4/2018 |
| KR | 10-2020-0065931 | 6/2020 |
| KR | 20200066169 | 6/2020 |
| WO | WO-2015165161 A1 * | 11/2015 ............ D06F 23/02 |
| WO | WO 2016/030118 | 3/2016 |
| WO | WO2018/066805 | 4/2018 |
| WO | WO2020/111817 | 6/2020 |

OTHER PUBLICATIONS

Office Action in Korean Appln. No. 10-2020-0113078, dated Oct. 24, 2023, 10 pages (with English translation).
Office Action in Japanese Appln. No. 2023-514984, dated Nov. 28, 2023, 7 pages (with English translation).
Office Action in Japanese Appln. No. 2023-514489, dated Dec. 5, 2023, 12 pages (with English translation).
Office Action in Japanese Appln. No. 2023-514459, dated Dec. 5, 2023, 17 pages (with English translation).
Office Action in Japanese Appln. No. 2023-514821, dated Dec. 5, 2023, 13 pages (with English translation).
Extended European Search Report in European Appln No. 21194813.8, dated Jan. 12, 2022, 9 pages.
Extended European Search Report in European Appln No. 21194814.6, dated Jan. 26, 2022, 8 pages.
Extended European Search Report in European Appln No. 21194816.1, dated Feb. 2, 2022, 10 pages.
International Search Report and Written Opinion in International Appln. No. PCT/KR2021/011916, dated Dec. 20, 2021, 12 pages.
International Search Report and Written Opinion in International Appln. No. PCT/KR2021/011917, dated Dec. 20, 2021, 11 pages.
International Search Report and Written Opinion in International Appln. No. PCT/KR2021/011918, dated Dec. 24, 2021, 11 pages.
Office Action in U.S. Appl. No. 17/466,795, mailed on May 9, 2024, 8 pages.
Notice of Allowance in Korean Appln. No. 10-2020-0113078, mailed on Jun. 10, 2024, 2 pages (with English translation).

* cited by examiner

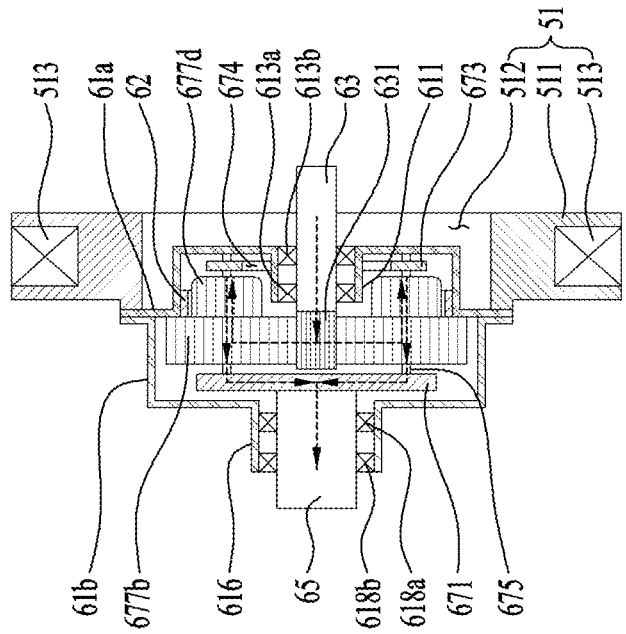
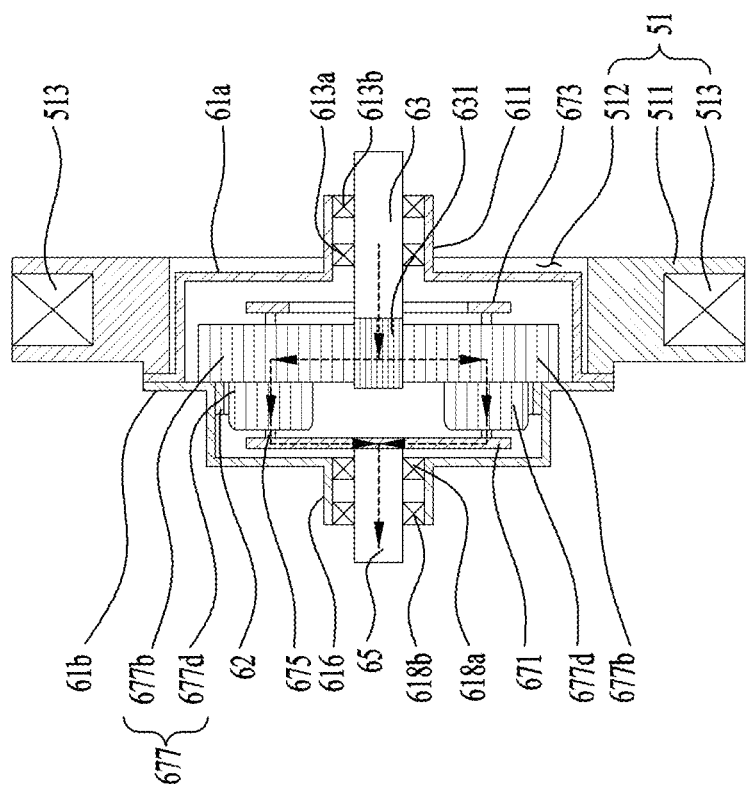
FIG. 9A
FIG. 9B

APPARATUS FOR TREATING LAUNDRY

CROSS-REFERENCE TO RELATED APPLICATIONS

This application claims the benefit of Korean Patent Application Nos. 10-2020-0113075, filed on Sep. 4, 2020, 10-2020-0113077, filed on Sep. 4, 2020, and 10-2020-0113078, filed on Sep. 4, 2020. The disclosures of the prior applications are incorporated by reference in their entirety.

TECHNICAL FIELD

The present disclosure relates to an apparatus for treating laundry.

BACKGROUND

A laundry treatment device is a generic term of a washer for washing laundry (e.g., a washing object or a drying object), a dryer for drying laundry, or a device that can perform both washing and drying of laundry.

A washer generally consists of a tub storing water therein, a wash drum provided within the tub to store laundry therein, and a drive part (or a wash drive part) rotating the wash drum. A dryer generally consists of a dry drum storing laundry therein, a drive part (or a dry drive part) driving the dry drum, and a heat exchanger removing moisture from laundry by supplying air to the dry drum.

The wash drive part generally consists of a stator fixed to the tub to form a rotating magnetic field, a rotor rotated by the rotating magnetic field, and a rotating shaft penetrating the tub to connect the wash drum and the rotor together. On the other hand, the dry drive part generally consists of a motor, a pulley fixed to a rotating shaft of the motor, and a belt (or a power transmission part) connecting a rotational motion of the pulley to the dry drum.

The wash drive part is configured in a manner that a rotating shaft connects the wash drum and the rotor together. For washing or dewatering of laundry, the wash drive part needs to control an rpm (revolutions per minute) of the wash drum to become high or change a rotation direction of the wash drum. If the rotating shaft of the motor is configured to directly connect the wash drum and the rotor together, the rpm and rotation direction of the wash drum can be controlled with ease.

On the other hand, a dry drive part of the related art is generally configured in a manner that a power transmission part such as a belt or the like connects a dry drum and a rotating shaft of a motor to each other. Since it is less probable that a dryer needs to maintain a high rpm of the dry drum or change a direction of rotation of the dry drum, so it is okay to rotate the dry drum via the power transmission part such as a belt and the like. However, if the rpm and rotation direction of the dry drum can be changed, the dryer can also be expected to reduce the drying time and improve drying performance, as the motion of laundry inside the dry drum can be controlled.

Some washers of the related art are equipped with a drive part (e.g., decelerator and motor) that decelerates a rotation speed of a rotor and transmits it to a drum (Korean Patent Laid-Open Gazette No. 10-2004-0071426). In the related art washer equipped with the decelerator and motor, a stator of the motor and the decelerator are fixed to a tub each. In other words, the stator provided to the related art washer is fixed not to the decelerator directly but to the tub (i.e., a structure that the oscillation width of the stator and the oscillation width of the decelerator may differ from each other). The drive part of the aforementioned structure is not easy to maintain concentricity between an input shaft connected to the rotor and an output shaft connected to the drum when the tub and drum vibrate, and to maintain a space between the stator and rotor.

Some related-art laundry treatment devices capable of laundry drying are equipped with a supply flow path for supplying air to a drum. However, the supply flow path of the related art is configured to intensively discharge air to a prescribed area of the rum instead of evenly supplying air into the drum.

A related-art dryer (Korean Patent Laid-Open Gazette No. 10-2018-0106034) having a power transmission part such as a belt and the like configured to connect a circumferential surface of a dry drum and a rotating shaft of a motor together consists of a cylindrical drum body having an open front side and an open rear side, a first support part rotatably supporting the front side of the drum body, a second support part rotatably supporting the rear side of the drum body, and a belt connecting a circumferential surface of the drum body and the rotating shaft of the motor together.

In the above-configured dryer, the belt rotates the drum body by the motor. In order for the belt to rotate the drum body without slip, the belt needs considerable tension. Although the belt having the considerable tension can minimize the slip effect during rotation of the motor, it is disadvantageous in that the drum body may be deformed by the tension of the belt during the rotation. If the drum body is deformed by the belt, laundry within the drum body may be struck in a space formed between the first support part and the front side of the drum body or a space between the second support part and the rear side of the drum body.

Consequently, while the belt rotates the drum body without slip, if laundry is stuck in a space between the support part and the drum body, the motor needs to be configured to output high torque to maintain the rotation of the drum body.

On the other hand, there is a related art dryer consisting of a drum body in a hollow cylindrical shape, a front cover forming a front side of the drum body, a rear cover forming a rear side of the drum body, a rotating shaft rotatably fixing the rear cover to a rear side of a cabinet, and a belt connecting a circumferential surface of the drum body and a rotating shaft of a motor together. Since the above-configured dryer of the related art avoids the deformation of the drum body while the drum rotates, the problem of interrupting the rotation of the drum by laundry may be solved. However, in order to control an rpm of the drum to become high or promptly change a rotation direction of the drum, it is still disadvantageous in that a motor capable of high torque output should be included.

SUMMARY

One technical task of the present application is to provide a laundry treating apparatus including a drive part configured to decelerate and transmit a rotation speed of a rotor to a drum so as to form a concentric axis between a rotation center of the rotor and a rotation center of the drum.

Another technical task of the present application is to provide a laundry treating apparatus capable of minimizing a volume of a drive part.

Another technical task of the present application is to provide a laundry treating apparatus capable of minimizing that a flow of air supplied to a drum is focused on a prescribed area of the drum (reducing a drying time).

Another technical task of the present application is to provide a laundry treating apparatus provided with a cooling flow path for cooling a stator.

Another technical task of the present application is to provide a laundry treating apparatus capable of minimizing deformation of a drum during rotation and facilitating a low-torque drive part to change an rpm of the drum and a rotation direction of the drum.

Further technical task of the present application is to provide a laundry treating apparatus capable of minimizing forward and backward vibrations of a drum.

Another further technical task of the present application is to provide a laundry treating apparatus capable of minimizing upward and downward vibrations of a drum.

Technical tasks obtainable from the present invention are non-limited by the above-mentioned technical task. And, other unmentioned technical tasks can be clearly understood from the following description by those having ordinary skill in the technical field to which the present invention pertains.

Additional advantages, objects, and features of various embodiments for a display device will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, an apparatus for treating laundry according to one embodiment of the present disclosure may include a drum having a drum body providing a space for storing the laundry, a front cover forming a front side of the drum body, a rear cover forming a rear side of the drum body, and a drum entrance perforating the front cover to communicate with an inside of the drum body, a fixed panel provided to a location spaced apart from the rear cover, a hollow cylindrical housing fixed to the fixed panel, a motor having a stator fixed to at least one of the fixed panel or the housing to form a rotating field and a rotor rotated by the rotating field, a ring gear fixed to an inside of the housing, a first shaft having one end fixed to the rotor and the other end located within the housing, a driver gear located within the housing by being fixed to the first shaft, a second shaft having one end fixed to the rear cover by penetrating the fixed panel and the other end located within the housing so as to form a concentric axis with the first shaft, a base located within the housing and having the other end of the second shaft fixed thereto, and a driven gear having a first body rotatably fixed to the base, a first gear provided to a circumferential surface of the first body to engage with the driver gear, a second body fixed to the first body and having a diameter smaller than that of the first body, and a second gear provided to a circumferential surface of the second body to engage with the ring gear.

A diameter of the first gear may be set greater than that of the driver gear and a diameter of the second gear may be set greater than that of the driver gear and smaller than that of the first gear.

A diameter of the first gear may be set greater than that of the driver gear and a diameter of the second gear may be set equal to that of the driver gear.

The housing may include a second housing fixed to the fixed panel to rotatably support the second shaft and a first housing fixed to the second housing to rotatably support the first shaft.

A circumferential diameter of the second housing may be set smaller than that of the first housing and the ring gear may be fixed to a circumferential surface of the first housing.

A circumferential diameter of the second housing may be set smaller than that of the first housing and the ring gear may be fixed to a circumferential surface of the second housing.

The stator may include a core fixed to at least one of the fixed panel or the housing and a core perforated hole configured to perforate the core, and at least one partial area of the housing may be located in the core perforated hole.

The apparatus may further include a first shaft support part protruding from the first housing toward the second housing, a first shaft perforated hole perforating the first shaft support part to have the first shaft inserted therein, and a first shaft bearing rotatably fixing the first shaft to the first shaft support part.

The apparatus may further include a connecting shaft fixed to the base to configure a rotating shaft of the driven gear, a base cover fixed to the connecting shaft to form a space for receiving the driven gear therein, and a base cover perforated hole configured to perforate the base cover, and a free end of the first shaft support part may be configured to pass through the base cover perforated hole.

The first shaft bearing may include a first shaft first bearing and a first shaft second bearing provided along a length direction of the first shaft.

The apparatus may further include a second shaft bearing fixing the second shaft to the second housing rotatably.

The second shaft bearing may include a second shaft first bearing and a second shaft second bearing provided along a length direction of the second shaft.

The apparatus may further include a front panel having an entrance and a door configured to open/close the entrance, a support panel located between the front panel and the front cover, a support panel perforated hole configured to perforate the support panel, a drum connecting body connecting the support panel perforated hole to the drum entrance, a panel connecting body connecting the support panel perforated hole to the entrance, a first outlet configured to perforate the panel connecting body, a second outlet configured to perforate the fixed panel, an exhaust duct connecting the first outlet and the second outlet to each other, a supply duct supplying external air to the drum, and a heat exchange part heating the external air having flown into the supply duct.

The apparatus may further include a front panel having an entrance and a door configured to open/close the entrance, a support panel located between the front panel and the front cover, a support panel perforated hole configured to perforate the support panel, a drum connecting body connecting the support panel perforated hole to the drum entrance, a panel connecting body connecting the support panel perforated hole to the entrance, a first outlet configured to perforate the panel connecting body, a second outlet configured to perforate the fixed panel, an exhaust duct connecting the first outlet and the second outlet to each other, a heat exchange part dehumidifying and heating air moving along the exhaust duct, an inlet configured to perforate the fixed panel, a supply duct guiding air discharged from the second outlet to the inlet, an air inlet having a multitude of holes disposed in a ring shape, a multitude of the holes perforating the rear cover, and a flow path forming part configured in a ring shape enclosing the air inlet and fixed to the fixed panel so as to guide air discharged from the inlet to the air inlet.

The apparatus may further include a damper in a ring shape provided to a free end of the drum connecting body or the drum entrance to connect the free end of the drum connecting body to an edge of the drum entrance.

The damper may include a felt.

The apparatus may further include a drive part installation recess configured in a manner that the fixed panel is concavely bent toward the rear panel, a fixed panel perforated hole provided to the drive part installation recess to be penetrated by the second shaft, and a drive part bracket provided within the drive part installation recess by being fixed to the fixed panel so as to have the housing fixed thereto.

The apparatus may further include a sealing part provided to the drive part bracket or the fixed panel to seal the fixed panel perforated hole.

In another aspect of the disclosure, as embodied and broadly described herein, an apparatus for treating laundry according to another embodiment of the present disclosure may include a drum providing a space for storing the laundry, a fixed panel provided to a location spaced apart from the drum, a hollow housing fixed to the fixed panel, a motor having a stator fixed to at least one of the fixed panel or the housing to form a rotating field and a rotor rotated by the rotating field, a ring gear fixed to an inside of the housing, a first shaft having one end fixed to the rotor and the other end located within the housing, a driver gear located within the housing by being fixed to the first shaft, a second shaft having one end fixed to the drum by penetrating the fixed panel and the other end located within the housing so as to form a concentric axis with the first shaft, a base located within the housing and having the other end of the second shaft fixed thereto, and a driven gear provided to the base to connect the driver gear and the ring gear to each other, the driven gear including two or more first bodies rotatably fixed to the base, a first gear provided to a circumferential surface of each of the first bodies to engage with the driver gear, a second body protruding from each of the first bodies toward a direction having the rotor located therein and having a diameter smaller than that of the first body, and a second gear provided to a circumferential surface of each of the second bodies to engage with the ring gear.

The first gear may be located between the base and the ring gear and the second gear may be located between one side of the housing located in a direction toward the rotor and the first gear.

The housing may include a second housing fixed to the fixed panel to rotatably support the second shaft and a first housing fixed to the second housing to rotatably support the first shaft and having the ring gear fixed thereto, the first gear may be located in a space formed by the second housing, and the second gear may be located in a space formed by the first housing.

A diameter of the first housing may be set smaller than that of the second housing.

The stator may include a core fixed to the housing, a core perforated hole configured to perforate the core, and a coil provided to a circumferential surface of the core, and at least one partial area of the first housing may be inserted in the core perforated hole.

The apparatus may further include a first shaft support part extended toward a space formed between the second gears in the first housing, a first shaft perforated hole perforating the first shaft support part to have the first shaft inserted therein, and a first shaft bearing provided to the first shaft support part to rotatably fix the first shaft to the first shaft support part.

The first shaft bearing may include a first shaft first bearing and a first shaft second bearing provided along a length direction of the first shaft and at least one of the first shaft first bearing or the first shaft second bearing may be located in a space formed between the second bodies.

In further aspect of the disclosure, as embodied and broadly described herein, an apparatus for treating laundry according to further embodiment of the present disclosure may include a drum providing a space for storing the laundry, a fixed panel provided to a location spaced apart from a rear side of the drum, a hollow housing fixed to the fixed panel, a motor having a core fixed to the housing, a core perforated hole configured to perforate the core to provide a space for receiving the housing therein, a coil provided to a circumferential surface of the core to form a rotating field, and a rotor rotated by the rotating field, a first shaft having one end fixed to the rotor and the other end located within the housing, a driver gear located within the housing by being fixed to the first shaft, a ring gear located within the housing by being fixed to the housing, a base rotatably provided within the housing, a second shaft having one end fixed to the rear cover and the other end fixed to the base so as to form a concentric axis with the first shaft, and a driven gear rotatably provided to the base to connect the driver gear and the ring gear to each other.

The housing may include a first housing rotatably supporting the first shaft by being located within the core perforated hole and having an open side facing the fixed panel and a second housing rotatably supporting the second shaft by being fixed to the fixed panel and having the first housing fixed thereto.

At least one portion of the second housing may be located within the core perforated hole.

The apparatus may further include a core installation part provided to the housing to have the core fixed thereto.

The core installation part may be projected from a circumferential surface of the second housing along a diameter direction of the core perforated hole.

The apparatus may include a core bracket provided to the core and a core fastening part fastening the core bracket, the first housing and the second housing together.

The apparatus may further include a first shaft support part protruding from the first housing toward the second housing, a first shaft perforated hole perforating the first shaft support part to have the first shaft inserted therein, and a first shaft bearing rotatably fixing the first shaft to the first shaft support part.

The first shaft bearing may include a first shaft first bearing and a first shaft second bearing provided along a length direction of the first shaft.

The apparatus may further include a second shaft support part provided to the second housing, a second shaft perforated hole perforating the second shaft support part to have the second shaft inserted therein, and a second shaft bearing rotatably fixing the second shaft to the second shaft support part.

The second shaft bearing may include a second shaft first bearing and a second shaft second bearing respectively fixed to locations spaced apart from each other along a length direction of the second shaft.

The apparatus may further include a fixed panel perforated hole configured to perforate the fixed panel, and the second shaft support part may be projected from the second housing toward a direction for being inserted in the fixed panel perforated hole.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Accordingly, embodiments of the present invention provide various effects and/or features of a mobile terminal.

First of all, the present disclosure provides a laundry treating apparatus including a drive part configured to decelerate and transmit a rotation speed of a rotor to a drum so as to form a concentric axis between a rotation center of the rotor and a rotation center of the drum.

Secondly, the present disclosure provides a laundry treating apparatus capable of minimizing a volume of a drive part.

Thirdly, the present disclosure provides a laundry treating apparatus capable of minimizing that a flow of air supplied to a drum is focused on a prescribed area of the drum (reducing a drying time).

Fourthly, the present disclosure provides a laundry treating apparatus provided with a cooling flow path for cooling a stator.

Fifthly, the present disclosure provides a laundry treating apparatus capable of minimizing deformation of a drum during rotation and facilitating a low-torque drive part to change an rpm of the drum and a rotation direction of the drum.

Sixthly, the present disclosure provides a laundry treating apparatus capable of minimizing forward and backward vibrations of a drum.

Seventhly, the present disclosure provides a laundry treating apparatus capable of minimizing upward and downward vibrations of a drum.

Effects obtainable from the present disclosure may be non-limited by the above-mentioned effects. And, other unmentioned effects can be clearly understood from the following description by those having ordinary skill in the technical field to which the present disclosure pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures.

FIGS. 4 to 6 and FIGS. 9A and 9B are diagrams showing embodiments of a power transmission part.

DETAILED DESCRIPTION

Reference will now be made in detail to the preferred embodiments of the present disclosure, examples of which are illustrated in the accompanying drawings. Meanwhile, elements or control method of apparatuses which will be described below are only intended to describe the embodiments of the present disclosure and are not intended to restrict the scope of the present disclosure. Wherever possible, the same reference numbers will be used throughout the drawings to refer to the same or like parts.

Figure 1:
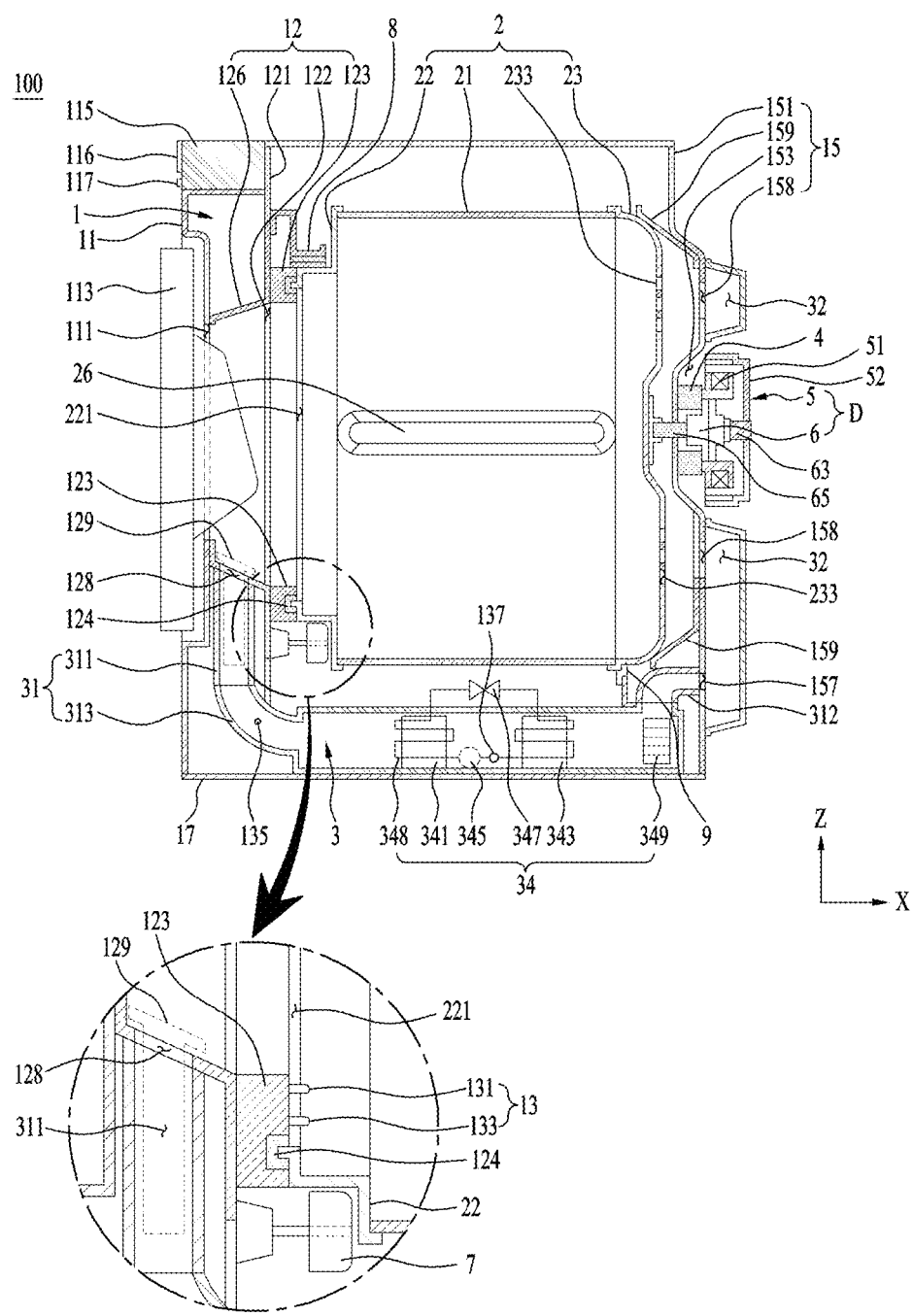
FIG. 1 and FIG. 2 are diagrams showing one example of a laundry treating apparatus.

FIG. 1 is a diagram showing one example of a laundry treating apparatus 100. The laundry treating apparatus 100 may include a cabinet 1, a drum 2 rotatably provided within the cabinet 1 to provide a space for storing laundry (e.g., a washing object or a drying object) therein, a supply part 3 removing moisture from laundry by supplying hot dry air (e.g., air at the temperature higher than room temperature, air at a dryness degree higher than that of room air, etc.), and a drive part D rotating the drum.

The cabinet 1 includes a front panel 11 forming a front side of the laundry treating apparatus and a base panel 17 forming a bottom side of the laundry treating apparatus. An entrance 111 communicating with the drum 2 may be formed in the front panel 11 and configured to be closed by a door 113.

A control panel 115 is provided to the front panel 11. An input unit 116 receiving an input of a control command from a user and a display unit 117 outputting information such as a user-selectable control command and the like may be provided to the control panel 115. The input unit 116 may include a power supply request unit making a request for power supply to the laundry treating apparatus 100, a course input unit enabling a user-desired course to be selected, and an execution request unit making a request for initiation of a user-selected course.

The drum 2 may be configured in a hollow cylindrical shape. FIG. 1 shows an example of a case that the drum 2 includes a drum body 21 in a cylindrical shape having an open front side and an open rear side, a front cover 22 forming a front side of the drum body 21, and a rear cover 23 forming a rear side of the drum body 21. A drum entrance enabling an inside of the drum body 21 to communicate with an outside may be provided to the front cover 22.

A lifter 26 may be further included in the drum body 21. The lifter 26 may be configured in a manner that a board extended from the front cover 22 toward the rear cover 23 is projected from the drum body 21 toward a rotation center of the drum 2 (i.e., projected from a circumferential surface of the drum toward the rotation center of the drum).

In case that the laundry treating apparatus 100 is provided as a device for the laundry drying only, a drum perforated hole configured to perforate the drum body 21 to enable an inside of the drum to communicate with an outside of the drum may not be provided to the drum 2.

The drum 2 may be rotatably fixed to at least one of a first body support part 12 and a second body support part 15. FIG. 1 shows an example of a case that the rear cover 23 is rotatably fixed to the second body support part 15 via the drive part D and that the front cover 22 is rotatably connected to the first body support part 12.

The first body support part 12 may include a support panel 121 located between the front panel 11 and the front cover 22 by being fixed to the cabinet 1. FIG. 1 shows an example of a case that the support panel 121 is fixed to the base panel 17 and located between the front panel 11 and the front cover 22. In this case, a rear side (i.e., a side that faces the support panel) of the front panel 11 may be fixed to the support panel 121 and a bottom end may be fixed to the base panel 17.

The support panel 121 may include a support panel perforated hole 122, a drum connecting body 123 connecting the support panel perforate hole 122 and the drum entrance 221, and a panel connecting body 126 connecting the support panel perforated hole 122 and the entrance 111 to each other. The support panel perforated hole 122 is a means for enabling the entrance 111 and the drum entrance 221 to communicate with each other in a manner of being configured to perforate the support panel 121.

The drum connecting body 123 may include a pipe fixed to a rear side (i.e., a side that faces the drum entrance in a space provided by the support panel) of the support panel 121. One end of the drum connecting body 123 may be configured to enclose the support panel perforated hole 122, and a free end of the drum connecting body 123 may be configured to support the front cover 22. Namely, the free end of the drum connecting body 123 may be configured to be inserted in the drum entrance 221 or contact with a free end of the front cover 22 forming the drum entrance 221.

FIG. 1 shows an example of a case that the free end of the drum connecting body 123 contacts with the free end of the front cover 22. In this case, a damper 124 (i.e., a connecting damper) in a ring shape may be provided to the drum connecting body 123. The connecting damper 124 is a means for minimizing a risk that the drum entrance 221 is separated from the drum connecting body 123 on rotation or vibration of the drum 2 (e.g., a risk that air in the drum leaks to the cabinet).

The connecting damper 124 may be formed on compressive material (e.g., material capable of increasing/decreasing a volume by an external force). In this case, the connecting damper 124 may be configured to maintain a compressed state between the free end of the drum connecting body 123 and an edge (i.e., the free end of the front cover) of the drum entrance 221 (configured to maintain the compressed state by a rear support part described later). This is to minimize the separation of the drum entrance 221 from the drum connecting body 123 when the drum 2 vibrates between the support panel 121 and the fixed panel 131. A felt fabricated by compressing fiber may become one example of the connecting damper 124.

The panel connecting body 126 may include a pipe fixed to a front side (e.g., a side facing the front panel in the space provided by the support panel) of the support panel 121. One end of the panel connecting body 126 may be configured to enclose the support panel perforated hole 122, and the other end of the panel connecting body 126 may be configured to be connected to the entrance 111. Hence, laundry supplied into the entrance 111 may move to the drum body 21 through the panel connecting body 126, the support panel perforated hole 122, the drum connecting body 123 and the drum entrance 221.

The second body support part 15 may include a fixed panel 151 fixed to the cabinet 1 so as to be located at a position spaced apart from the rear cover 23. FIG. 1 shows an example of a case that the fixed panel 151 is fixed to the base panel 17 so as to form a rear side (i.e., the rear side of the cabinet) of the laundry treating apparatus 100.

Figure 2:
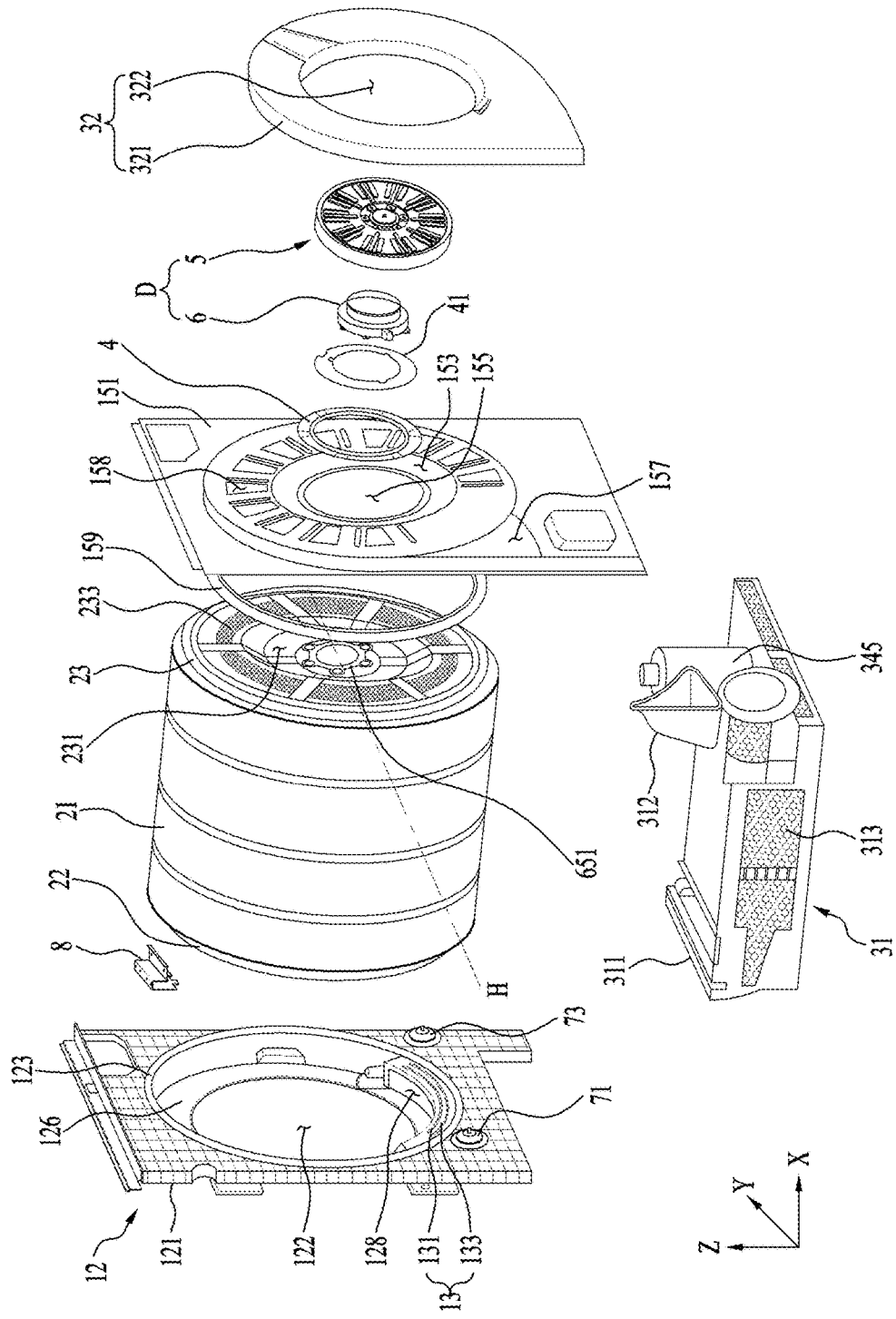

As shown in FIG. 2, a drive part installation recess 153 providing a space for installing the drive part D therein may be provided to the fixed panel 151. The drive part installation recess 153 may include a recess configured in a manner that the fixed panel 151 is concavely bent toward the rear cover 23 of the drum. A fixed panel perforated hole 155 penetrated by the rotating shaft of the drum 2 is provided to the fixed panel 151, and may be located in the drive part installation recess 153.

As described above, if the drum 2 includes the drum body 21, the front cover 22 fixed to the drum body 21, and the rear cover 23 fixed to the drum body 21, rigidity of the drum is increased more than that of the structure that the open front side and the open rear side of the drum body 21 are rotatably connected to the support panel 121 and the fixed panel 151, respectively. If the rigidity of the drum is increased, deformation of the drum body 21 can be minimized during the rotation of the drum, thereby minimizing the problem that laundry is stuck in a space between the drum body and the support panel or a space between the drum body and the fixed panel due to the deformation of the drum body 21 (i.e., the load of the drive part can be minimized).

A drum outlet (or a first outlet) 128 may be provided to the support panel 121, and a panel outlet (or a second outlet) 157 and an inlet 158 may be provided to the fixed panel 151. The first outlet 128 may include a hole that passes through the panel connecting body 126.

The inlet 158 may be configured in a manner that a multitude of perforate dholes configured to penetrate the fixed panel 151 are disposed to enclose the drive part installation recess 153 (e.g., a multitude of the perforated holes may be configured to form a ring that encloses the drive part installation recess).

As shown in FIG. 1, the supply part 3 may include an exhaust duct 31 connecting the first outlet 128 and the second outlet 157 to each other, a supply duct 32 guiding air discharged through to the second outlet 157 to the inlet 158, and a heat exchange part 34 provided to the exhaust duct 31 to sequentially execute dehumidification and heating of air. A filter 129 filtering air moving from the drum 2 to the exhaust duct 31 may be provided to the first outlet 128.

The exhaust duct 31 may include a first duct 311 connected to the first outlet 128, a second duct 312 connected to the second outlet 157, and a third duct 313 connecting the first duct 311 and the second duct 312 together. The third duct 313 may be fixed to the base panel 17.

The heat exchange part 34 may include various devices capable of executing dehumidification and heating of air that flows into the exhaust duct 31. FIG. 1 shows an example of a case that the heat exchange part 34 includes a heat pump and a fan 349.

Particularly, the heat exchange part 34 shown in FIG. 1 includes a first heat exchanger (e.g., a heat absorbing part) 341 removing moisture from air flowing into the exhaust duct 31, a second heat exchanger (e.g., a heating part) 343 provided within the exhaust duct 31 to heat the air having passed through the heat absorbing part 341, and a fan 359 moving the air discharged from the drum 2 to the supply duct 32 via the heat absorbing part and the heating part in order. FIG. 1 shows an example of a case that the fan 349 is located between the heating part 343 and the second duct 312.

The heat absorbing part 341 and the heating part 343 are disposed in order along a moving direction of air and connected to each other through a refrigerant pipe 348 forming a circulation flow path of a refrigerant. The refrigerant is moved by a compressor 345 located outside the exhaust duct 31 along the refrigerant pipe 348, and a pressure regulator 347 regulating a pressure of the refrigerant moving from the heating part 343 to the heat absorbing part 341 is provided to the refrigerant pipe 348.

The heat absorbing part 341 is a means for cooling air (e.g., evaporating a refrigerant) by transferring heat of air flowing into the exhaust duct 31 to the refrigerant, and the heating part 343 is a means for heating air (e.g., condensing a refrigerant) by transferring heat of the refrigerant having passed through the compressor 345 to the air.

As shown in FIG. 2, the supply duct 32 is a means for guiding the air discharged through the second outlet 157 to the inlet 158 by being fixed to the fixed panel 151.

In case that the inlet 158 includes a multitude of perforated holes disposed in a ring shape, the supply duct 32 may include a duct body 321 fixed to the fixed panel 151 and forming a flow path connecting the second outlet 157 and the inlet 158 to each other and a rotor receiving part 322 configured to penetrate the duct body 321. The supply duct 32 including the duct body 321 and the rotor receiving part 322 forms a flow path in a ring shape approximately, and the drive part D fixed to the drive part installation recess 153 is exposed to an outside of the supply duct 32 by the rotor receiving part 322.

To supply the air supplied into the cabinet 1 through the inlet 158 to the drum 2, an air inlet 233 configured to perforate the rear cover 23 may be provided to the drum 2 and a flow path forming part 159 guiding the air discharged from the inlet 158 to the air inlet 233 may be provided to the fixed panel 151.

The air inlet 233 may be configured in a manner that a multitude of holes perforating the rear cover 23 form a ring that encloses a rotation center of the drum 2. The flow path forming part 159 may include a pipe having one end (e.g., one end fixed to the fixed panel) enclosing the inlet 158 and the other end (e.g., one end contacting with the drum) enclosing the air inlet 233. In order to minimize an effect that vibration, which is generated when the drum 2 rotates, is transferred to the fixed panel 151, the flow path forming part 159 may be formed of a substance (e.g., rubber, etc.) having high elasticity.

A radius of a ring formed by the air inlet 233 (or an inner or outer diameter of the ring) may be set equal to or greater than ½ of a radius of the rear cover 23. Thus, the air moving into the drum through the air inlet 233 can move along a circumferential surface of the drum.

When the air inlet 233 is configured in the above manner, if the supply part 3 is controlled to supply air when the drum rotates at an rpm that triggers a centrifugal force over 1G (when laundry is rotated while closely adhering to the circumferential surface of the drum), the laundry treating apparatus may reduce a drying time.

As shown in the drawing, the supply part 3 may include an exhaust duct connecting the first outlet 128 and the second outlet 157 to each other, a supply duct supplying external air (e.g., air inside the cabinet or air outside the cabinet) to the drum 2, and a heat exchange part heating the air flowing into the supply duct.

To sense a dryness degree of laundry placed within the drum 2, a sensing part 13 may be further included in the laundry treating apparatus 100. The sensing part 13 may be configured to measure a dryness degree via electric resistance measured when contacting with laundry, measure a dryness degree by measuring a temperature of air discharged from the drum 2, or measure a dryness degree by measuring a temperature of a refrigerant circulating along the refrigerant pipe 348.

FIG. 2 shows an example of a case that the sensing part 13 is configured to measure electrical resistance of laundry. The sensing part 13 shown in FIG. 2 may include first and second electrodes 131 and 133 fixed to the support panel 121. It is necessary for the first and second electrodes 131 and 133 to maintain a state of being spaced apart from each other while fixed to the support panel 121. The first and second electrodes 131 and 133 may be fixed in a space located under a horizontal line, which passes through a center of the entrance 111, in a space provided by the support panel 121. In this case, if laundry is placed under the horizontal line passing through the rotation center of the drum 2 (e.g., if the laundry is located at the lowest point of the drum), the first and second electrodes 131 and 133 may be facilitated to contact with the laundry.

If a dryness degree of laundry is raised, an amount of moisture remaining in the laundry will be reduced. If the dryness degree increases, a size of current sensed by the sensing part 13 may decrease. Hence, a controller (not shown) may estimate a dryness degree of the laundry by monitoring a size of the current transmitted from the sensing part.

If a dryness degree of laundry is low, a temperature of air discharged from the drum 2 is low. If a dryness degree gets higher, a temperature of air discharged from the drum 2 becomes higher. Hence, the sensing part 13 may be configured to sense a temperature of air discharged from the drum. As shown in FIG. 1, the sensing part 13 may include a temperature sensor 135 (e.g., an air temperature detection sensor) provided to the exhaust duct 31.

Since a temperature of a refrigerant circulating a refrigerant pipe varies depending on a dryness degree of laundry, the sensing part 13 may include a temperature sensor measuring a temperature of a refrigerant moving along the refrigerant pipe (e.g., a temperature of a refrigerant moving from the heat absorbing part to the compressor, a temperature of a refrigerant moving from the compressor to the heating part, etc.). FIG. 1 shows an example of a case that the sensing part 13 includes the temperature sensor (a refrigerant temperature detecting sensor) 137 sensing a temperature of a refrigerant moving from the compressor 345 to the heating part 343.

The sensing part 13 may include at least two of a pair of electrodes 131 and 133 measuring electrical resistance of laundry, a temperature sensor 135 measuring a temperature of air discharged from the drum, and a temperature sensor 137 measuring a temperature of a refrigerant.

The drive part D may include a motor 5 located at the drive part installation recess 153 and a power transmission part 6 fixed to the fixed panel 151 to transmit power generated by the motor 5 to the drum 2.

To minimize an effect that the fixed panel 151 is deformed by the weight of the drive part D and the external force generated from operating the drive part D, a drive part bracket 4 providing a space for fixing at least one of the motor 5 and the power transmission part 6 thereto may be provided to the drive part installation recess 153. Namely, the power transmission part 6 may be fixed to the drive part bracket 4 and the motor 5 may be fixed to at least one of the power transmission part 6 and the drive part bracket 4. The drive part bracket 4 may include a metal (e.g., metal having solidity greater than that of the fixed panel) in a ring shape fixed to the drive part installation recess 153.

Figure 3:
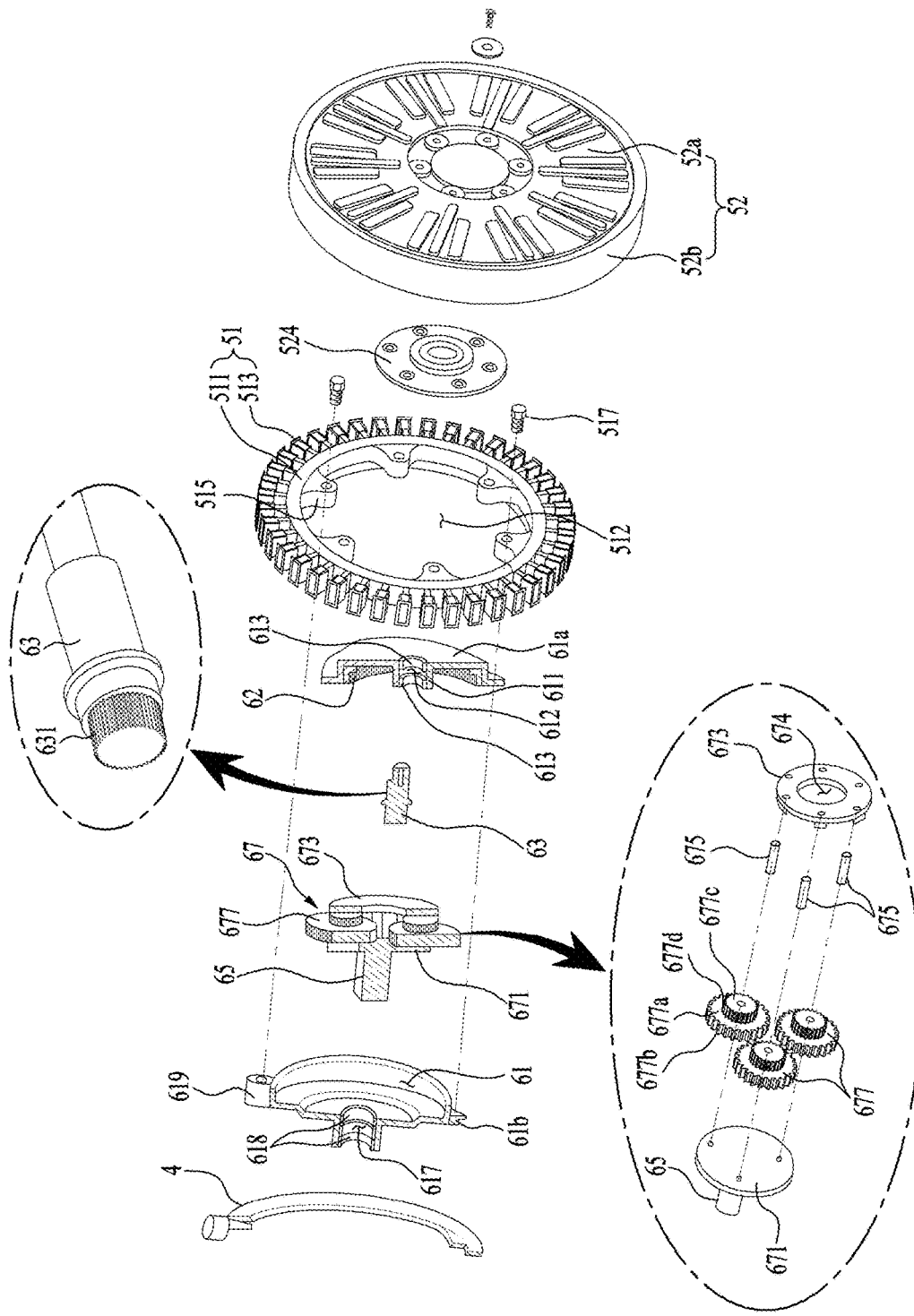
FIG. 3 is a diagram showing one example of a drive part.

As shown in FIG. 3, the motor 5 may include a stator 51 forming a rotating field and a rotor 52 rotated by the rotating field.

The stator 51 may include a core 511 fixed to the drive part bracket 4 or the power transmission part 6, a core perforated hole 512 provided to perforate the core, and an electromagnet (e.g., coil) 513 disposed on a circumferential surface of the core 511 in a manner of being equally spaced.

The rotor 52 may include a rotor body 52a in a disk shape, a rotor circumferential surface 52b in a pipe shape fixed to the rotor body, and a multitude of permeant magnets 525 fixed to the rotor circumferential surface. The permanent magnets 525 are fixed to the rotor circumferential surface 52b in a manner that N poles and S poles are alternately exposed.

The power transmission part 6 may include a housing 61 in a hollow cylindrical shape fixed to the fixed panel 151, a ring gear 62 fixed to an inside of the housing, a first shaft (i.e., an input shaft) 63 having one end fixed to the rotor body 52a and the other end located within the housing 61, a driver gear 631 located within the housing 61 by being fixed to the first shaft 63, a driven gear 677 connecting the driver gear 631 and the ring gear 62 together, a cage 67 rotated within the housing 61 by the driven gear, and a second shaft 65 having one end fixed to the rear cover 23 and the other end fixed to the cage 67.

To minimize the risk of deformation of the rotor body 52a by the first shaft 63, the first shaft 63 may be fixed to the rotor body 52a via a fixed plate 524.

The second shaft 65 may be preferably configured to form a concentric axis with the first shaft 63. If the second shaft 65 and the first shaft 63 are configured to form the concentric axis, vibration generated from the power transmission part 6 may be minimized when the drum 2 rotates.

The housing 61 is preferably configured to be located in the core perforated hole 512 by being fixed to the fixed panel 151 via the drive part bracket 4. This is to minimize the volume of the drive part D in a manner that the housing 61 is placed within the core perforated hole 512.

The housing 61 may include a first housing 61a in a cylindrical shape having an open side facing the fixed panel 151 and a second housing 61b in a cylindrical shape having an open side facing the first housing so as to close the open side of the first housing by being coupled to the first housing 61a.

A first shaft support part 611 and a first shaft perforated hole 612 perforating the first shaft support part 611 may be provided to the first housing 61a. The first shaft 63 penetrates the first housing 61a by being inserted in the first shaft perforated hole 612, and a first shaft bearing 613 rotatably fixing the first shaft 63 to the first housing 61a may be provided to the first shaft support part 611.

Figure 4:
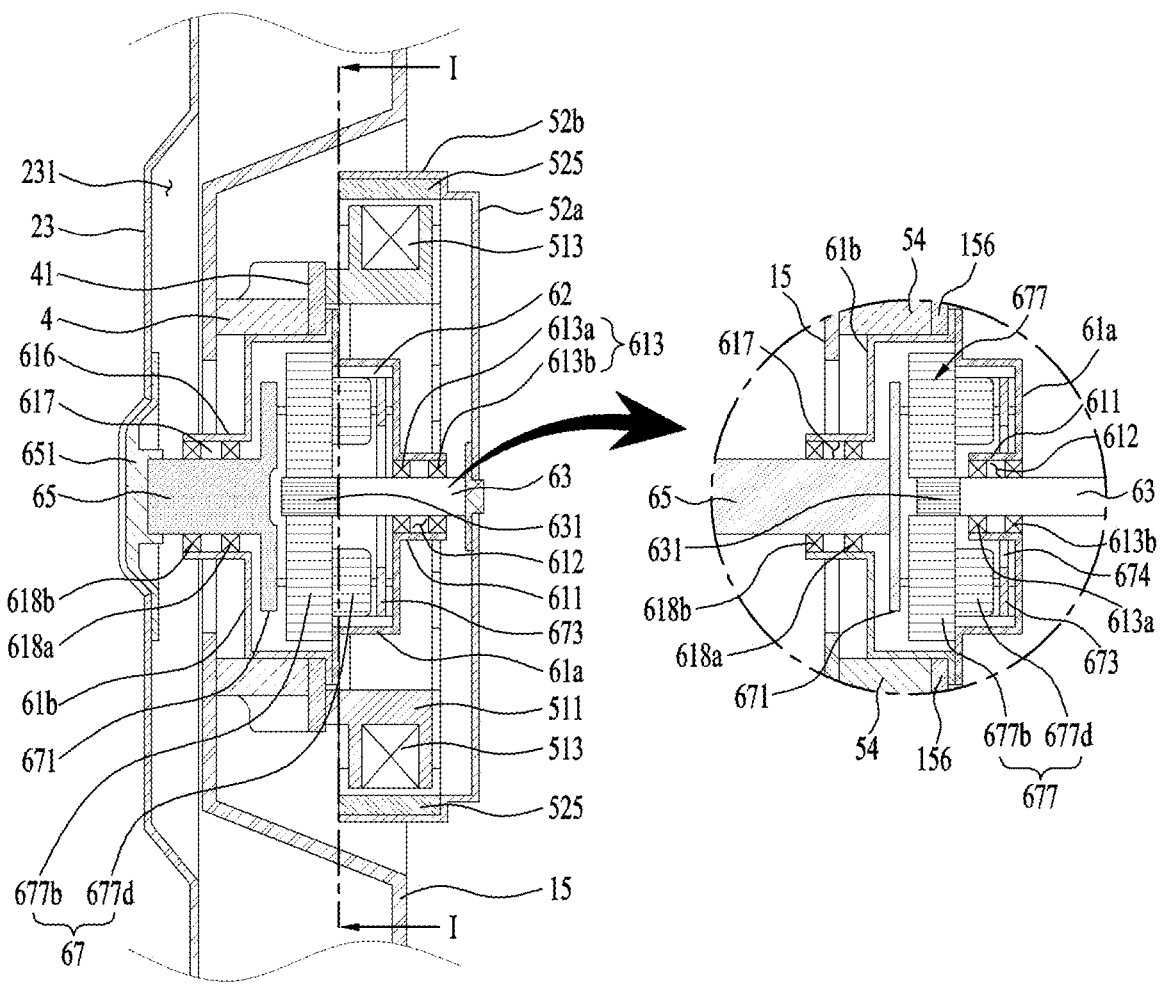

As shown in FIG. 4, the first shaft support part 611 may include a pipe protruding from the first housing 61a toward the rotor body 52a or a pipe protruding from the first housing 61a toward the second housing 61b.

If the first shaft support part 611 includes the pipe protruding from the first housing 61a toward the second housing 61b (e.g., a pipe protruding from the first housing toward a center of the housing), it brings an effect of minimizing the volume of the housing 61 (i.e., an effect of minimizing a volume of the drive part, an effect of minimizing a volume of the laundry treating apparatus).

A second shaft support part 616 and a second shaft perforated hole 617 perforating the second shaft support part 616 may be provided to the second housing 61b. The second shaft 65 penetrates the second housing 61b through the second shaft perforated hole 617, and a second shaft bearing 618 rotatably fixing the second shaft 65 to the second housing 61b may be provided to the second shaft support part 616.

The second shaft support part 616 may include a pipe protruding from the second housing 61b toward the fixed panel perforated hole 155 (e.g., a pipe protruding toward the rear cover of the drum).

The first shaft bearing 613 may include a first shaft first bearing 613a and a first shaft second baring 613b, and the second shaft bearing 618 may include a second shaft first bearing 618a and a second shaft second bearing 618b provided along a length direction of the second shaft 65.

If the first shaft bearing includes two or more bearings 613a and 613b and the second shaft bearing includes two or more bearings 618a and 618b, when the rotor 52 rotates, it is able to minimize an effect that the first shaft 63 and the second shaft 65 become eccentric (vibration generated from the drive part can be minimized).

Since several bearings need to be disposed along a rotating shaft, a volume of the drive part D provided with a multitude of bearings increases inevitably. Hence, it is difficult to design a rotation shaft to be supported by a multitude of bearings in the laundry treating apparatus 100 having the cabinet 1 in the limited volume. However, in the above-described laundry treating apparatus 100, the volume of the drive part can be minimized via the structure that the housing 61 is located in the core perforated hole of the stator, the pipe structure that the first shaft support part 611 protrudes toward the center of the housing and the like, whereby the number of the bearings 613 and 618 can be increased.

To minimize the volume of the housing 61, a diameter of the first housing 61a may be set different from that of the second housing 61b. Namely, the diameter of the first housing 61a may be set smaller or greater than that of the second housing 61b.

The ring gear 62 may include a ring gear body, a ring gear body perforated hole configured to perforate the ring gear body, and gear teeth provided along an inner circumferential surface of the ring gear body (e.g., a circumferential surface forming the ring gear body perforated hole).

The ring gear 62 may be fixed to either the first housing 61a or the second housing 61b, of which diameter is smaller. As shown in the drawing, if the diameter of the first housing 61a is set smaller than that of the second housing 61b, the ring gear 62 may be fixed to the circumferential surface of the first housing 61a.

As shown in FIG. 3, the cage 67 may include a base 671 located in the housing 61, a connecting shaft rotatably fixing the driven gear 677 to the base 671, and a base cover 673 in a ring shape fixed to one end of the connecting shaft 675.

The second shaft 65 may be configured to connect the base 671 and the rear cover 23 of the drum together by being inserted in the fixed panel perforated hole 155. To prevent the breakage of the rear cover 23 due to the rotation of the second shaft 65, a shaft bracket 651 having one end of the second shaft 65 fixed thereto may be provided to the rear cover 23.

As shown in FIG. 2, to minimize an effect that a volume of the drum is increased by the shaft bracket 651, a shaft bracket installation recess 231 having the shaft bracket 651 fixed thereto may be provided to the rear cover 23. The shaft bracket installation recess 231 may be configured in a manner that the rear cover 23 is bent toward a direction of getting far away from the fixed panel 151. Preferably, the shaft bracket installation recess 231 is located at the same position of the drive part installation recess 153 and a diameter of the shaft bracket installation recess 231 is set greater than that of the drive part installation recess 153. This is to minimize the risk that the rear cover 23 may collide with the drive part installation recess 153 when the drum 2 rotates.

The driven gear 677 may include a multitude of gears spaced apart from each other at the same angle. FIG. 3 shows an example of a case that the driven gear 677 and the connecting shaft 675 are configured with three gears spaced apart from each other at 120 degrees and three shafts spaced apart from each other at 120 degrees.

Each of the driven gears 677 may include a first body 677a rotatably fixed to the base 6761 via the connecting shaft 675, a first gear 677b provided to a circumferential surface of the first body 677a to engage with the driver gear 631, a second body 677c fixed to the first body 677a with a diameter smaller than that of the first body, and a second gear 677d provided to a circumferential surface of the second body 677c to engage with the ring gear 62.

As shown in FIG. 4, the driver gear 631 fixed to a free end of the first shaft 63 may be located in a space formed between the driven gears so as to be connected to each of the first gears 677b. A free end of the first shaft support part 611 may penetrate the base cover 673 by being inserted in a base cover perforated hole 674 formed at a center of the base cover 673. Such a structure (i.e., the structure of the first shaft support part and the base cover) is characterized in minimizing the volume of the housing (i.e., volume minimization of the drive part).

To seal the fixed panel perforated hole 155 (i.e., to prevent air supplied to the drum from leaking from the cabinet), a sealing part 41 may be further provided to the drive part bracket 4 or the fixed panel 151. If the drive part bracket 4 is configured in a ring shape enclosing the fixed panel perforated hole 155 and the housing 61 is fixed to the drive part bracket 4 to be located in the core perforated hole 512, the sealing part 41 may be configured to seal a space formed between the drive part bracket 4 and the second housing 61b.

Figure 5:
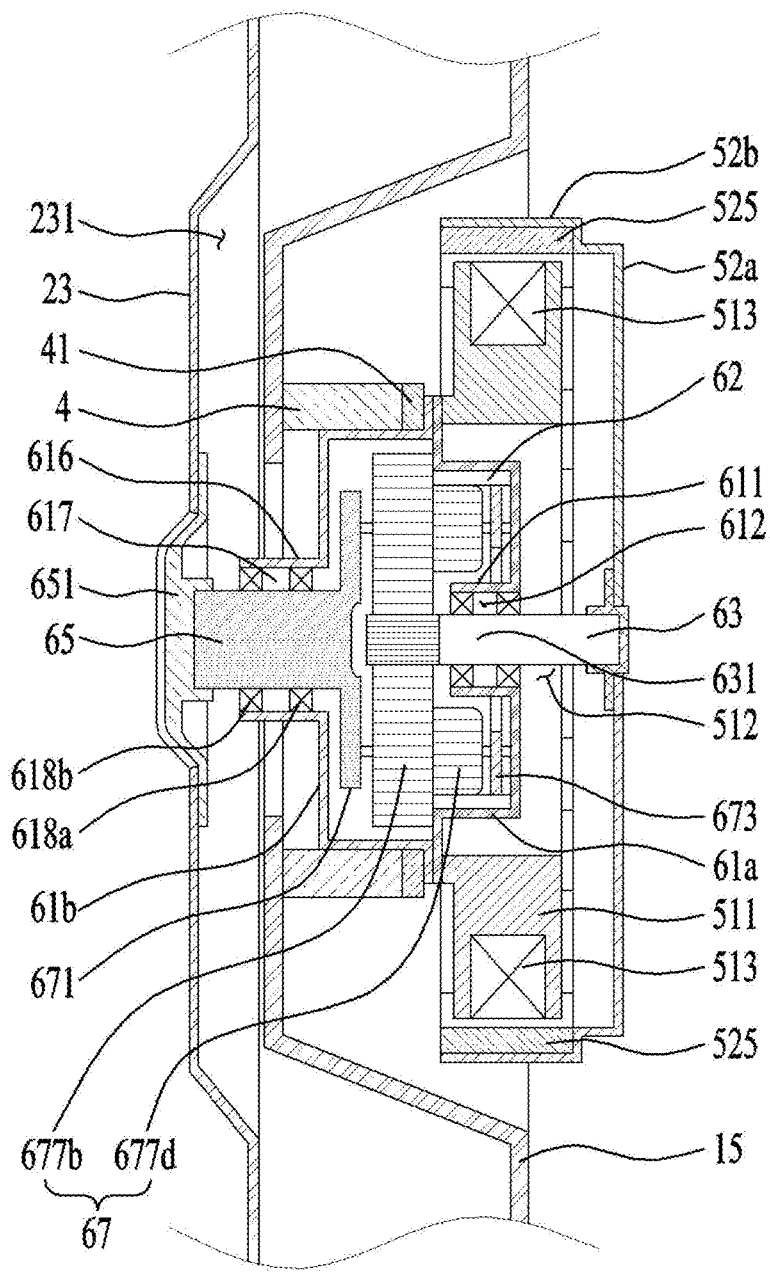

The drive part D shown in FIG. 5 has the same structure of the drive part D shown in FIG. 4 except that the stator 51 is fixed to the housing 61. Namely, the drive part D shown in FIG. 4 has the stator 51 fixed to the fixed panel 151 via the drive part bracket 4, while the drive part D shown in FIG. 5 has the stator 51 fixed to the fixed panel 151 via the housing 61 of the power transmission part.

As shown in FIG. 3, if the stator 51 is fixed to the housing 61, a core bracket 515 may be provided to the core 511 and a core installation part 619 may be provided to the housing 61. The core 511 may be fixed to the housing 61 via a core fastening part 517 fixing the core bracket 515 to the core installation part 619. The core installation part 619 may include a projection projected toward a direction of getting far away from a circumferential surface of the second housing 61b along a diameter direction of the second housing 61b.

Figure 6:
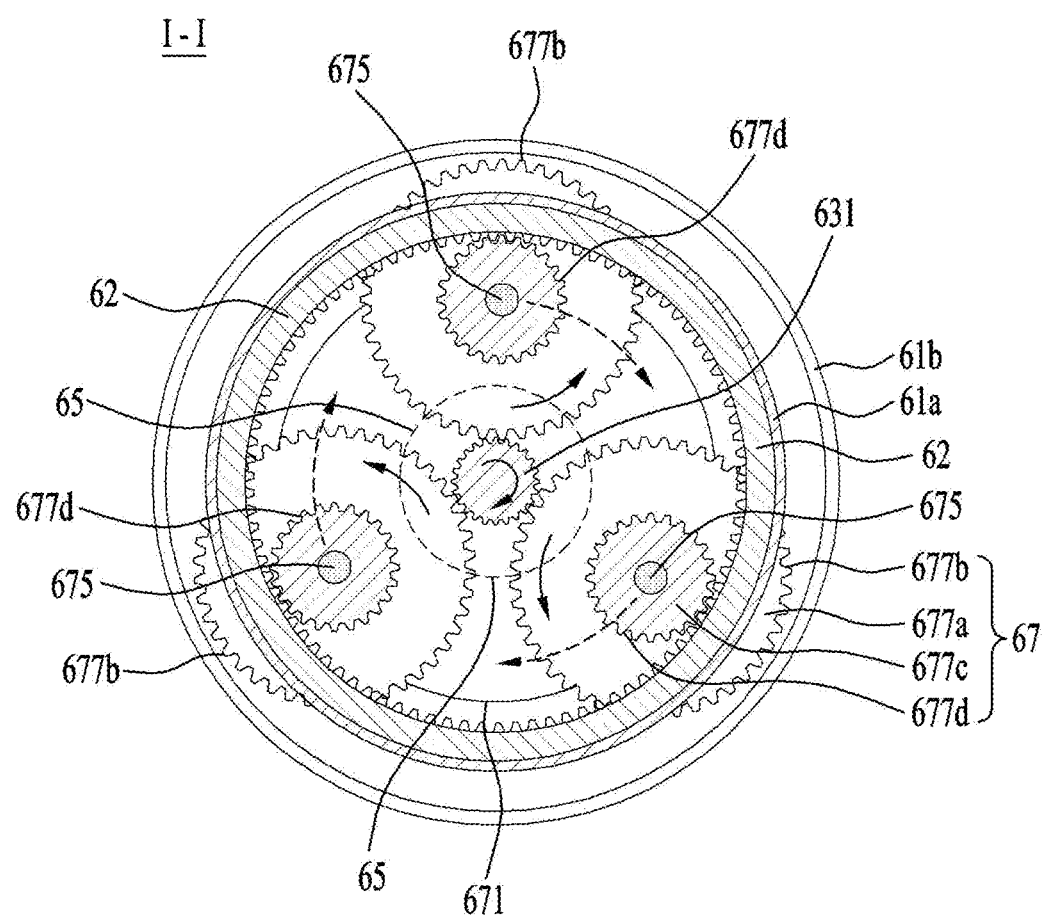

An operating process of the above-configured drive part D is described as follows. As shown in FIG. 6, if the rotor 52 rotates clockwise, the first shaft 63 and the driver gear 631 will rotate clockwise as well.

If the driver gear 631 rotates clockwise, the driven gears 677 will be rotated counterclockwise by the first gears 677b, respectively. If the first gear 677b rotates counterclockwise, the second gear 677d rotates counterclockwise as well. Since the ring gear 62 is fixed to the fixed panel 15, if the second gear 677d rotates counterclockwise, the base 671 and the second shaft 65 will rotate clockwise. As the drum 2 and the base 671 are connected together via the second shaft 65, the drum 2 will rotate in the same direction of the rotor 52.

If the stator 51 is fixed to the housing 61, it is advantageous in maintaining concentricity of the first and second shafts 63 and 65 and the space between the stator and the rotor. Assume a case that the stator 51 is fixed not to the housing 61 but to the fixed panel 151. In this case, vibration of the drum and vibration of the fixed panel 151 will be transferred to the second shaft 65 and the vibration of the fixed panel 151 will be transferred to the first shaft 63. If the vibration of the drum 2 and the vibration of the fixed panel 151 differ from each other in amplitude, it may be difficult to maintain the desired levels of the space and concentricity of the first and second shafts and the desired level of a space between the coil 513 of the stator and the permanent magnet 525 of the rotor. Yet, if the stator 51 is fixed to the housing 61, the same vibration is transferred to each of the first and second shafts externally, thereby solving the aforementioned problem.

As shown in the drawing, a diameter of the first gear 677b may be set greater than that of the driver gear 631. A diameter of the second gear 677d may be set greater than that of the driver gear 631 and smaller than that of the first gear 677b. The diameter of the second gear 677d may be set equal to that of the driver gear 631 [not shown in the drawing].

If the first gear, the second gear and the driver gear are provided as described above, the drive part D may rotate the drum 2 at an rpm lower than that of the rotor 52. Namely, the drive part D may play a role as a decelerator.

Figure 7:
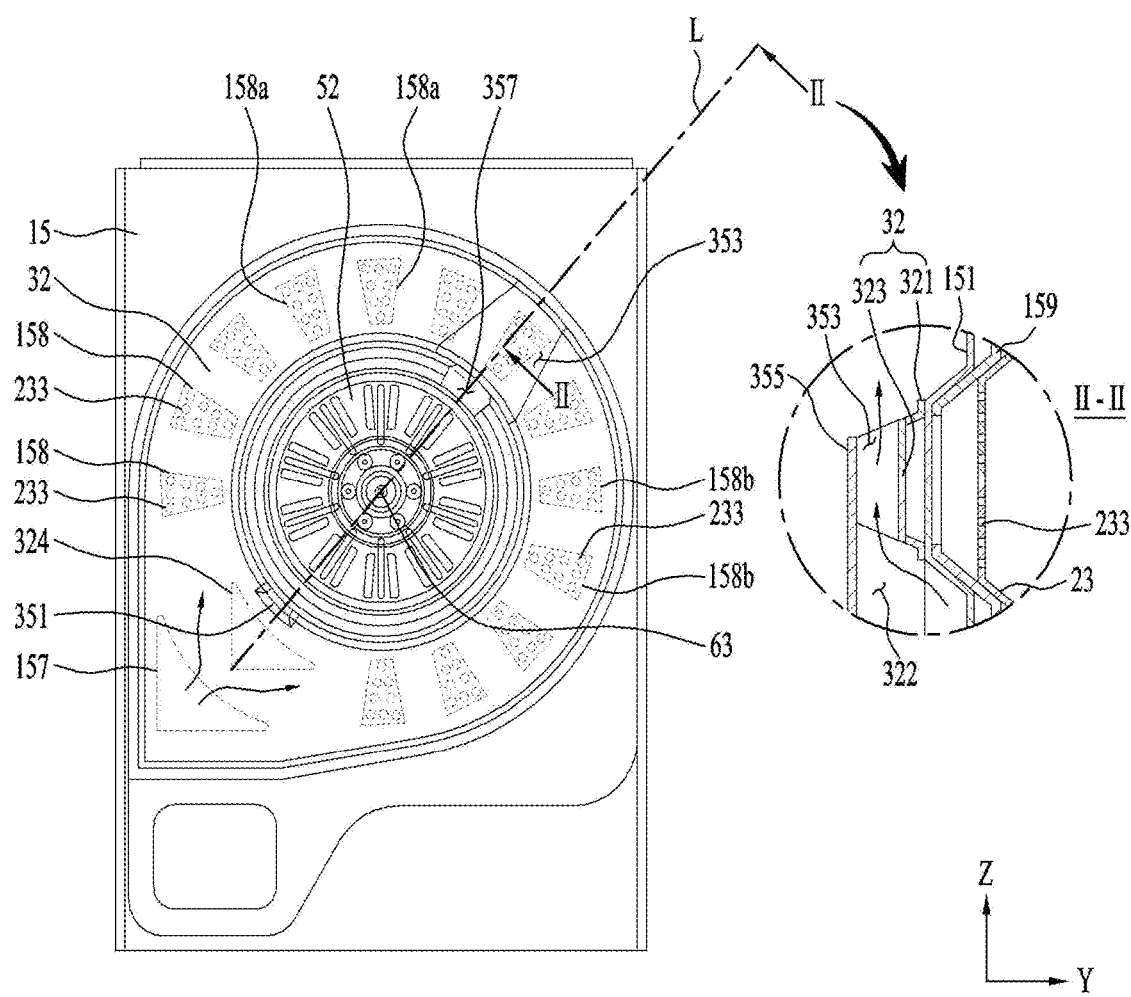
FIG. 7 is a diagram showing one example of a supply part.

As described above, a multitude of the perforated holes 158a and 158b disposed in a ring shape are provided to the rear cover 23 of the drum. As shown in FIG. 7, a flow path guide 324 supplying air discharged from the second outlet 157 to the perforated holes evenly may be further provided to the laundry treating apparatus 100.

As air moves to a side of small flow path resistance, if the laundry treating apparatus 100 fails to include the flow path guide 324, regarding the air having flown into the duct body 321 through the second outlet 157, an amount of the air moving inside the duct body 321 clockwise tends to differ from an amount of the air moving inside the duct body 321 counterclockwise. For example, if the amount of the air moving inside the duct body 321 clockwise is greater than that of the air moving inside the duct body 321 counterclockwise, more air is supplied to the perforated holes 158a located on a left side of a reference line L but less air is supplied to the perforated holes 158b located on a right side of the reference line L.

The unbalance of the aforementioned air supply amount may cause the unbalance of air supplied to laundry within the drum 2. Namely, if an amount of the supplied air varies depending on a location of laundry, it may cause a problem of an increased drying time and a problem of an over-dried state of one laundry or an undried state of another laundry.

If the amount of the air moving inside the duct body 321 clockwise is maintained equal or similar to that of the air moving inside the duct body 321 counterclockwise, the above problems can be solved.

The flow path guide 324 may be configured in a shape including a first incline guiding some of air discharged from the second outlet 157 to the left side of the reference line L and a second incline guiding the rest of the air to the right side of the reference line L. Therefore, by the flow path guide 324, some of the air flowing into the duct body 321 will move to the perforated holes 158a located on the left side of the reference line L and the rest will move to the perforated holes 158a located on the right side of the reference line L.

The reference line L may be set as a straight line passing through a center of the rotor receiving part 322 and a center of the second outlet 157. Unlike the drawing, the reference line L may be set as a straight line passing through one point in the rotor receiving part 322 and one point in the second outlet 157.

Furthermore, a projected wall 323 partitioning an inside of the duct body 321 into two spaces may be further provided to the supply duct 32. The projected wall 323 may include a projection projected from the duct body 321 toward the fixed panel 151 or a projection projected from the fixed panel 151 toward the duct body 321. FIG. 7 shows a case that the projected wall 323 is projected from the duct body 321 toward the fixed panel 151.

A free end of the projected wall 323 may be configured to contact with the fixed panel 151 or not to contract with the fixed panel 151. FIG. 7 shows a case that the free end of the projected wall 323 fails to contract with the fixed panel 151.

Preferably, the projected wall 323 is located at a position that makes the number of the perforated holes 158a located on the left side of the reference line L equal to the number of the perforated holes 158a located on the right side of the reference line L. If the reference line L is set to bisect the number of the perforated holes, the projected wall 323 will be configured to be located on the reference line L.

Regarding the above-configured laundry treating apparatus 100, since the duct body 321 is configured to enclose the motor 5 (since the motor is located inside the rotor receiving part), it is possible for the motor 5 to overheat.

Figure 8:
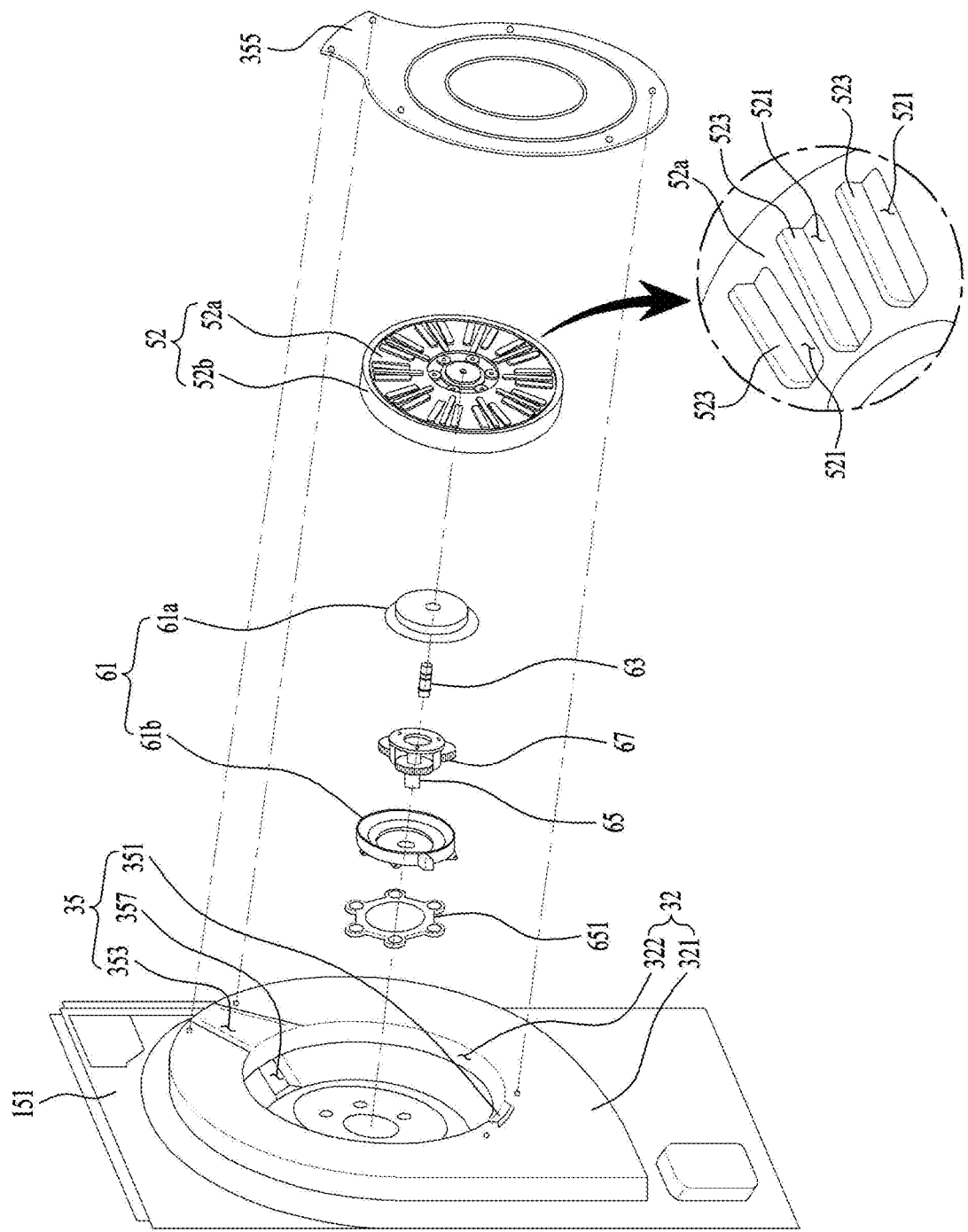
FIG. 8 is a diagram showing one example of a cooling flow path.

For the effective cooling of the motor 5 (e.g., for the cooling of the stator), a cooling flow path 35 may be further provided to the laundry treating apparatus 100. As shown in FIG. 8, the cooling flow path 35 may include a duct cover 355 fixed to the duct body 321 to close the rotor receiving part 322, an inlet flow path 351 provided to the duct body 321 to supply external air to the rotor receiving part 322, and an outlet flow path 353 provided to the duct body 321 to guide the air in the rotor receiving part 322 to an outside of the rotor receiving part 322.

Each of the inlet flow path 351 and the outlet flow path 353 may be configured as a recess formed in a manner that a top side of the duct body 321 is concavely bent. If the outlet flow path 353 is configured as the recess formed in a manner that the top side of the duct body 321 is bent toward the fixed panel 151, the projected wall 323 may be formed by a prescribed portion of the duct body 321 projected toward the fixed panel 151 to form the outlet flow path 353.

When the rotor 52 rotates, external air will flow into the rotor receiving part 322 through the inlet flow path 351 and the air in the rotor receiving part 322 may be discharged from the rotor receiving part 322 through the outlet flow path 353.

To facilitate the air flowing into the inlet flow path 351 to be discharged through the outlet flow path 353 (i.e., to facilitate the effective cooling of the motor), a vane 523 may be further provided to the rotor 52. The vane 523 may include a board projected from the rotor body 52a toward the duct cover 355.

The vane 523 may include a single board or a multitude of boards. In any cases, the vane 523 is preferably configured parallel to a diameter direction of the rotor body 52a. If the vane 523 includes the board parallel to the diameter direction of the rotor body, it may play a role as an impeller that forces air to move.

In order that heat generated from the stator 51 can be discharged to the rotor receiving part 322 more effectively, the rotor 52 may further include a rotor perforated hole 521 configured to perforate the rotor body 52a. The rotor perforated hole 521 may be configured in a manner that a multitude of holes are disposed to form a ring that encloses the first shaft 63.

The rotor perforated hole 521 may be configured as a slit, of which length for a diameter direction of the rotor body 52a is greater than a length for a circumferential direction of the rotor body 52a. In this case, the vane 523 may be fixed to an edge of the rotor perforated hole 521 parallel to the diameter direction of the rotor body 52a.

To facilitate the heat, which is generated from the stator 51, to be discharged to the rotor receiving part 322, a guide flow path 357 may be further provided to the drive part installation recess 153. The guide flow path 357 is a means for guiding the air in the drive part installation recess 153 to the outlet flow path 353.

To progress the cooling of the motor 5 more effectively, the inlet flow path 351, the rotation center of the rotor 52 and the outlet flow path 353 may be disposed on a single straight line. FIG. 7 shows an example of a case that the inlet flow path 351, the rotation center of the rotor 52, the guide flow path 357 and the outlet flow path 353 are disposed on the reference line L.

The power transmission part 6 shown in FIG. 4 and FIG. 5 may be provided with a structure in which the kinetic energy of the rotor 52 moves sequentially in the direction in which the rotor 52 is located toward a direction in which the drum 2 is located (i.e., a structure in which kinetic energy is transmitted a forward direction) or a structure in which the kinetic energy of the rotor 52 moves forward, backward and forward toward the drum located direction from the rotor located direction (i.e., a structure including a process for transmitting kinetic energy in a reverse direction).

FIG. 9A shows an example of a power transmission part in a structure that kinetic energy of a rotor is transmitted in a forward direction. FIG. 9B shows an example of a power transmission part in a structure that kinetic energy of a rotor is transmitted along a forward direction, a backward direction and a forward direction.

The driven gear 677 in FIG. 9A may include the first body 677a rotatably fixed to the base 671, the first gear 677b provided to the circumferential surface of the first body 677a to engage with the driver gear 631, the second body 677c protruding from the first body 677a toward a direction having the drum 2 located therein, and the second gear 677d provided to the circumferential surface of the second body to engage with the ring gear 62. In this case, the first gear 677b may be located between the first housing 61a and the ring gear 62, and the second gear 677d may be located between the first gear 677b and one side of the second housing 61b. The drawing shows an example that the first gear 677b is located in the space provided by the first housing 61a and that the second gear 677d is located in the space provided by the second housing 61b.

Regarding the power transmission part shown in FIG. 9A, the kinetic energy of the rotor 52 is transmitted as the kinetic energy of the driver gear 631 by the first shaft 63, the kinetic energy of the driver gear 631 is transmitted to the first gear 677b and the second gear 677d, the kinetic energy of the second gear 677d is transmitted to the base 671 and the second shaft 65. Since the above-described transmission of the kinetic energy is performed sequentially from the rotor 52 toward the drum 2, FIG. 9A may be defined as the forward power transmission structure.

On the other hand, the driven gear 677 in FIG. 9B may include the first body 677a rotatably fixed to the base 671, the first gear 677b provided to the circumferential surface of the first body 677a to engage with the driver gear 631, the second body 677c protruding from the first body 677a toward a direction having the rotor 52 located therein, and the second gear 677d provided to the circumferential surface of the second body to engage with the ring gear 62. In this case, the first gear 677b may be located between the base 671 and the ring gear 62, and the second gear 677d may be located between the first gear 677b and one side of the first housing 61a. The drawing shows an example that the first gear 677b is located in the space provided by the second housing 61b and that the second gear 677d is located in the space provided by the first housing 61a.

Regarding the power transmission part shown in FIG. 9B, the kinetic energy of the rotor 52 is transmitted as the kinetic energy of the driver gear 631 by the first shaft 63, and the kinetic energy of the driver gear 631 is transmitted to the first gear 677b [forward transmission of kinetic energy]. The kinetic energy of the first gear 677b is transmitted to the second gear 677d that is provided not in the drum located direction but in the rotor located direction. Therefore, the kinetic energy of the first gear 677b is transmitted in the backward direction. Thereafter, the kinetic energy of the second gear 677d is transmitted to the second shaft 65 via the base 671. Since the base 671 is located between the first gear 677b and the second housing 61b, the kinetic energy of the second gear 677d is transmitted to the second shaft 65 along the forward direction.

In the power transmission part of FIG. 9A, the second body 677c is provided as a cylinder protruding from the first body 677a toward the second housing 61b. On the other hand, in the power transmission part of FIG. 9B, the second body 677c is provided as a cylinder protruding from the first body 677a toward the first housing 61a. Thus, since the driven gears 677 of FIG. 9B can form a space, in which the free end of the first shaft support part 611 will be inserted, between the second gears 677d, the volume of the power transmission part 6 of FIG. 9B may be configured smaller than that of the power transmission part of FIG. 9B.

Furthermore, in case of FIG. 9B, if at least one of a multitude of the bearings 613a and 613b configuring the first shaft bearing 613 is provided to the first shaft perforated hole 612 so as to be located in the space formed by the second gears 677d, the volume of the power transmission part 6 will be further reduced.

In some implementations, to minimize the volume of the power transmission part D, the power transmission part 6 shown in FIG. 9A or FIG. 9B may be configured in a manner that at least one area of the first housing 61a is inserted in the core perforated hole 512.

As shown in FIG. 1, in the above-configured laundry treating apparatus 100, although the rear cover 23 of the drum maintains a state of being coupled to the fixed panel 15 via the drive part D, the front cover 22 of the drum maintains a state of contacting with the drum connecting body 123 of the support panel via the connecting damper 124. Hence, if the drum 2 is moved toward the rear side (in the X-axis direction) of the laundry treating apparatus, it is possible for the front cover 22 to be separated from the drum connecting body 123.

If the front cover 22 is separated from the drum connecting body 123, the drum entrance 221 will be separated from the support panel perforated hole 122 (so that the air supplied to the drum will leak from the drum) to cause such problems as energy waste, drying time increase, reduced drying efficiency, etc.

If the front cover 22 is separated from the drum connecting body 123, laundry may be stuck in the space between the front cover and the drum connecting body, whereby heavy load may be put on the motor.

To solve the above problems, the laundry treating apparatus 100 may further include at least one of a front support part 7 and 8 supporting the front cover 22 and a rear support part 9 supporting the rear cover 23. FIG. 1 shows an example of the laundry treating apparatus 100 including both of the front support part 7 and 8 and the rear support part 9.

The front support part 7 and 8 may be configured to minimize an effect that the front cover 22 moves along a height direction (e.g., Z-axis direction) of the support panel 121 and a width direction (e.g., Y-axis direction) of the support panel, and the rear support part 9 may be configured to minimize an effect that the rear cover 23 moves along a direction (e.g., X-axis direction and Z-axis direction) of getting far away from the support panel 121.

Figure 10:
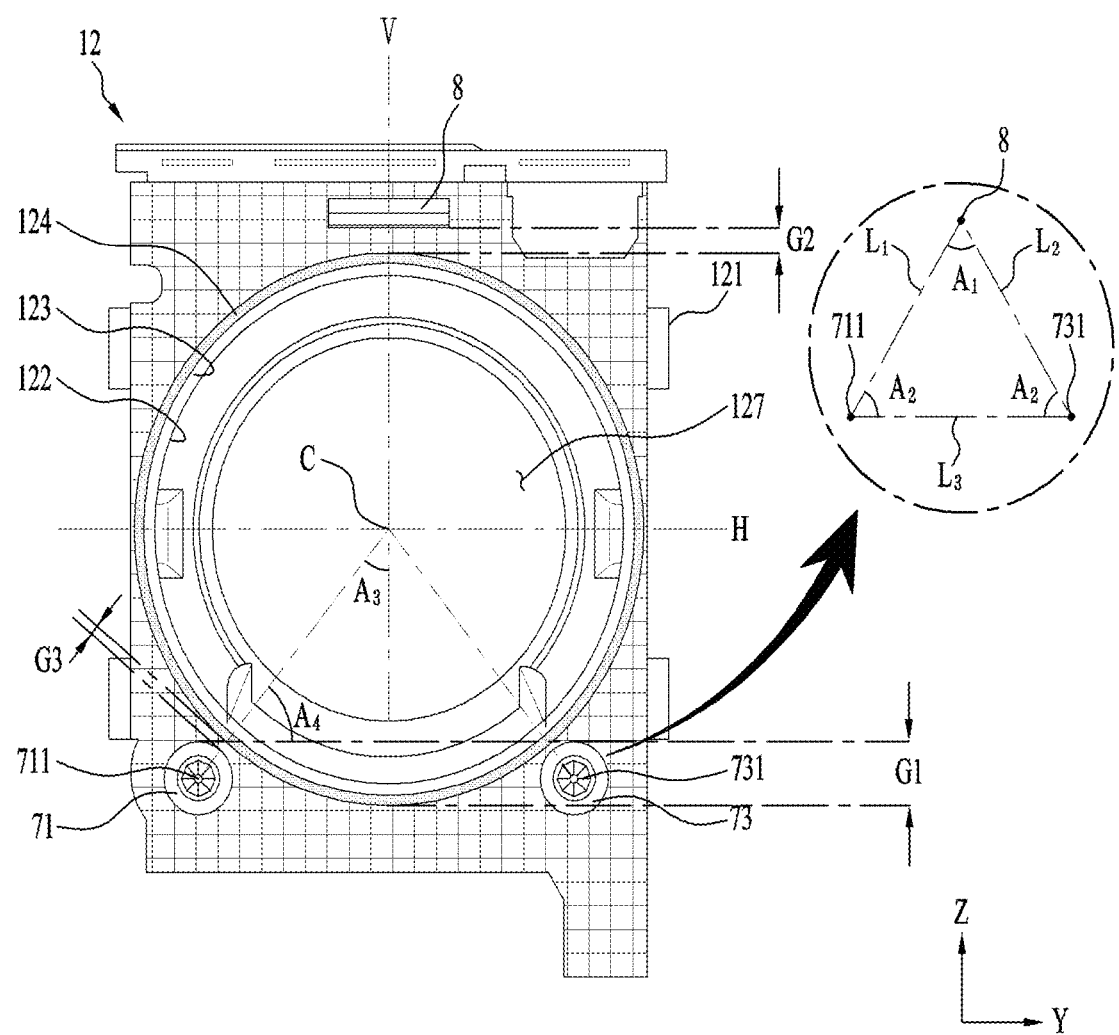
FIG. 10 is a diagram showing one example of a support panel.

As shown in FIG. 10, the front support part may include a first front support part 7 supporting an area of a circumferential surface of the front cover 22 located under a horizontal line H passing through the rotation center of the drum and a second front support part 8 supporting an area of the circumferential surface of the front cover 22 located over the horizontal line H.

The first front support part 7 provided to at least one of the base panel 17 and the support panel 121 is a means for setting a range in which the drum entrance 221 can move along a width direction (+Y-axis direction, -Y-axis direction) of the support body 121 and a range in which the drum entrance 221 can move toward a direction (-Z-axis direction) having the base panel 17 located therein.

The first front support part 7 may include a first roller 71 rotatably fixed to the support panel 121 via a first roller shaft 711 and a second roller 73 rotatably fixed to the support panel 121 via a second roller shaft 731.

To minimize a load put on each of the roller shafts 711 and 731, positions of the first and second rollers 71 and 73 may be preferably set to points symmetric to each other with respect to a vertical line V passing through the rotation center of the drum.

In addition, to minimize an effect that vibration of the drum is transferred to the cabinet through the rollers 71 and 73, each of the rollers 71 and 73 may be configured to contact with the circumferential surface of the front cover when vibration over a preset reference displacement is generated from the drum (e.g., each of the rollers may be configured to maintain a state of being spaced apart from the front cover).

Figure 11:
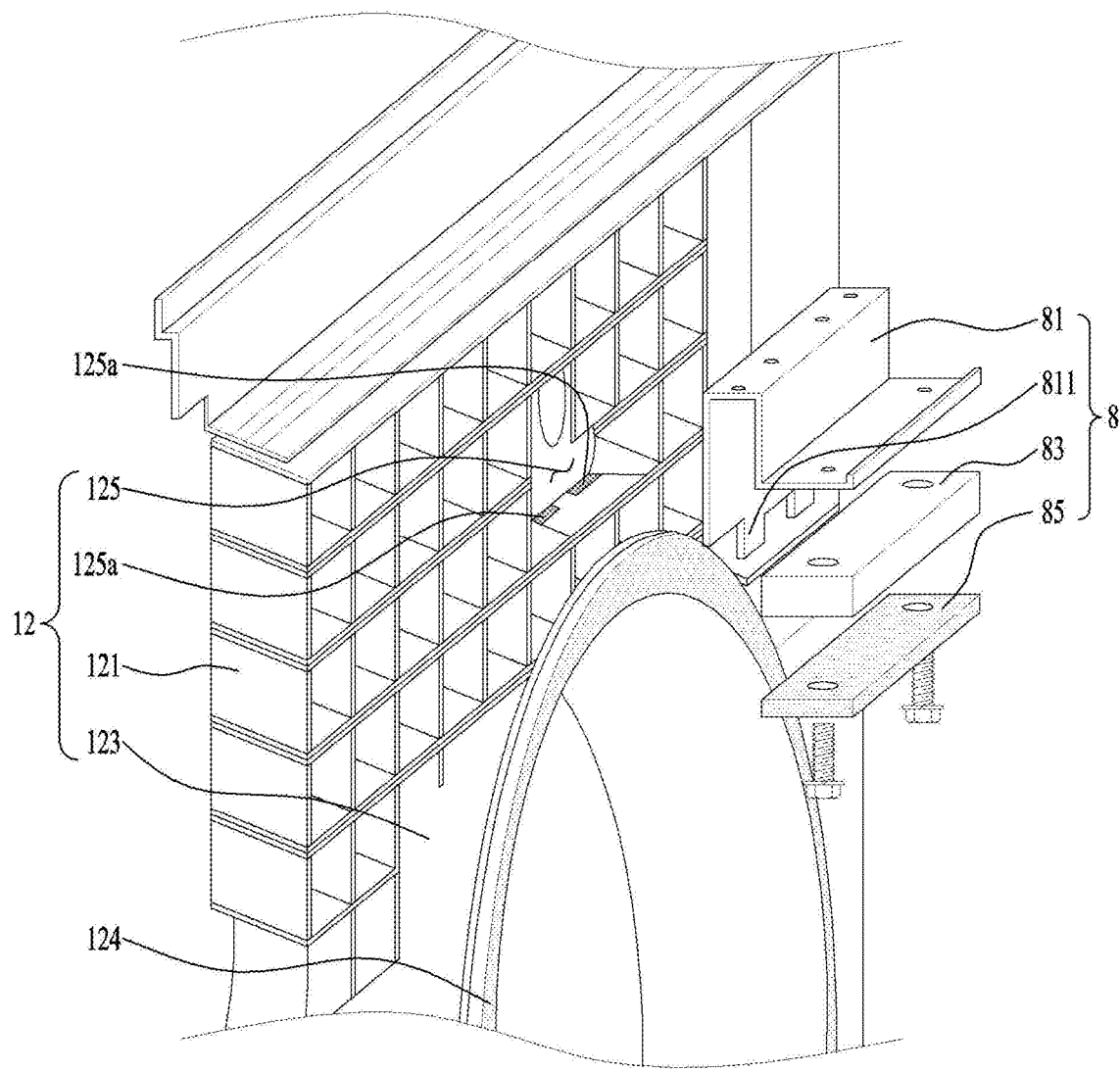
FIGS. 11 to 12B are diagrams showing one example of a front support part.

The second front support part 8 provided to the support panel 121 is a means for setting a range in which the drum entrance 221 can move in a direction (+Z) of getting far away from the base panel 17. As shown in FIG. 11, the second front support part 8 may include a front support frame 81 located at a point higher than the front cover 22 by being fixed to the support panel 121 and a support damper 83 and 85 fixed to the front support frame 81 to put limitation on movement of the front cover 22 along a height direction of the support body 121.

To fix the front support frame 81, a support part installation recess bent concavely toward a direction in which the support panel 121 gets far away from the front cover 22 may be provided to the support panel 121, a slot 125 may be provided to the installation recess 125, and a fastening part 811 may be provided to the front support frame 81 so as to be inserted in the slot 125a.

Figure 12A:
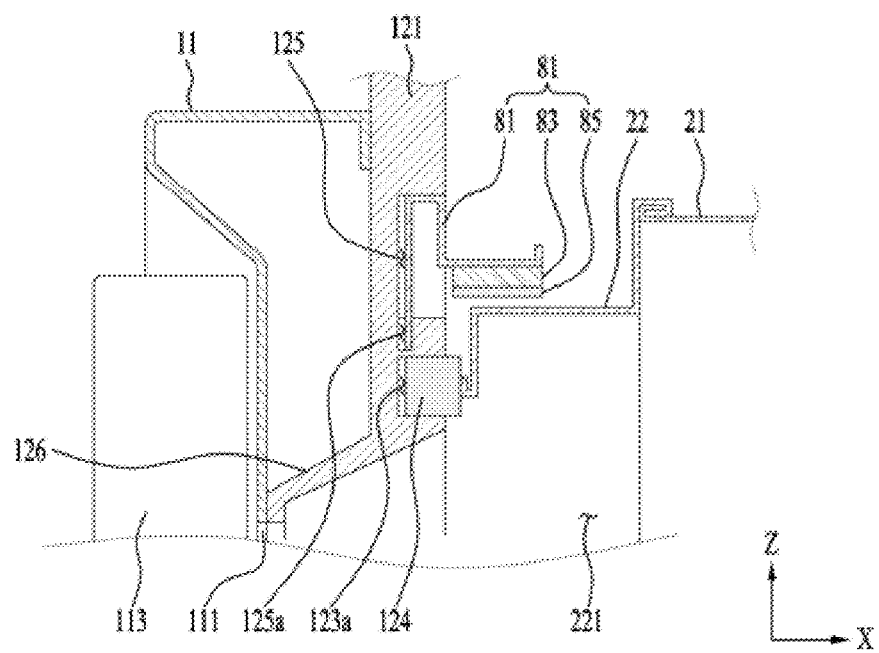

As shown in FIG. 12A, the support damper may include a first damper 83 fixed to the front support frame 81 and a second damper 85 fixed to the first damper 83 to support the circumferential surface of the front cover 22.

To enable to support damper 83 and 85 to effectively reduce the vibration of the drum 2, the first damper 83 may be formed of material having an elastic coefficient greater than that of the second damper 85. Namely, the second damper 85 may be provided with the same felt of the connecting damper 124, and the first damper 83 may be provided with rubber and the like.

As described above, the connecting damper 124 is fixed to the damper installation recess 123a provided in a ring shape to the free end of the drum connecting body 123 and may be configured to maintain a state pressurized in a direction of the support panel 121 by the front cover 22. This is to minimize an effect that the drum connecting body 123 and the edge of the drum entrance 221 are separated from each other.

Figure 12B:
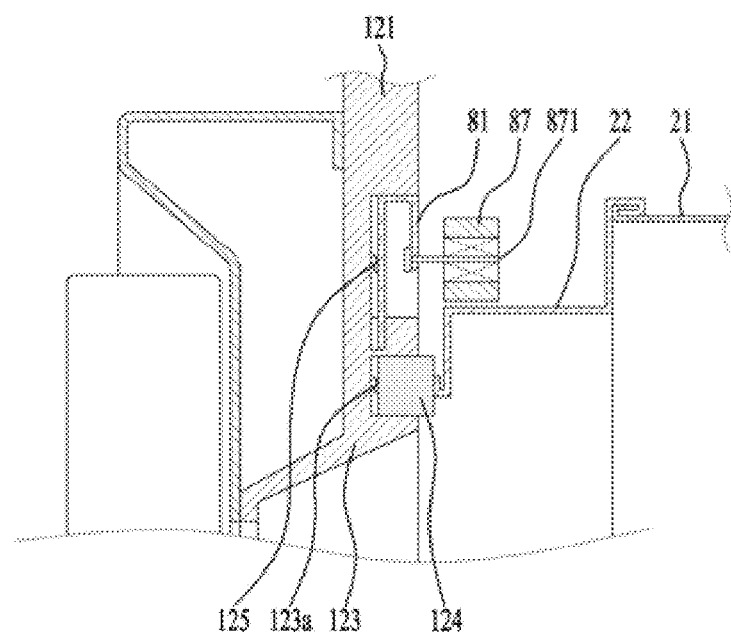

FIG. 12B shows another embodiment of the second front support part 8. The second front support part 8 of the present embodiment may include a front roller 87 rotatably fixed to the front support frame 81 via a roller shaft 871 to support the circumferential surface of the front cover 22.

Unlike the drawing, the first front support part 7 may be configured not to support the circumferential surface of the front cover 22 but to support the circumferential surface of the drum body 21. In this case, each of the rollers 71 and 73 may be configured to support the area of the circumferential surface of the drum body 21 located under the horizontal line H. If each of the rollers 71 and 73 supports the circumferential surface of the drum body (or the circumferential surface of the front cover), it means to include both 'a case that each of the rollers 71 and 73 is configured to contact with the circumferential surface of the drum body' and 'a case that each of the rollers 71 and 73 is spaced apart to contact with the drum body when vibration over a reference displacement is generated from the drum'.

Likewise, the second front support part 8 may be configured to support an area of the circumferential surface of the drum body 21 located over the horizontal line H. Namely, the second damper 85 may be configured to support the area of the circumferential surface of the drum body 21 located over the horizontal line H and the front roller 87 may be configured to support the area of the circumferential surface of the drum body 21 located over the horizontal line H.

If the second damper 85 and the front roller 87 support the circumferential surface of the drum body (or the circumferential surface of the front cover), it means to include both 'a case that the second damper 85 or the front roller 87 is configured to contact with the circumferential surface of the drum body' and 'a case that the second damper 85 or the front roller 87 is spaced apart to contact with the drum body when vibration over a reference displacement is generated from the drum'.

As shown in FIG. 10, if a space between the first and second rollers 71 and 73 gets narrower (i.e., if each of the first and second rollers is disposed to get closer to the lowest point of the front cover), it becomes highly probable that the circumferential surface of the front cover 22 will deviate from a space formed by the first roller 71, the second roller 73 and the second front support part 8.

To prevent the load working on the shafts 711 and 731 of the rollers from rapidly increasing while stably supporting the circumferential surface of the front cover 22 (i.e., to improve durability of the roller shafts), an angle A3 formed between the vertical line V and a straight line connecting a rotation center 711/713 of each of the rollers to a rotation center C of the drum is preferably set smaller than 60 degrees. This is because if the angle A3 between the vertical line V and the straight line connecting the rotation center 711/731 of the roller and the rotation center C of the drum exceeds 60 degrees, an external force applied to the shaft 711/731 of the roller increase rapidly.

For example, the angle A3 of the roller shaft with respect to the vertical line may be set to 50 to 52 degrees and an angle A4 formed by a straight line connecting the shaft 711/731 of each of the rollers to the rotation center C of the drum with respect to a horizontal line connecting the shafts of the two rollers to each other may be set to 40 to 38 degrees.

Furthermore, an angle A1 between a line L1 connecting the rotation center 711 of the first roller to the center of the second front support part 8 and a line L2 connecting the rotation center 731 of the second roller to the center of the second front support part 8 may be set to 30 to 50 degrees. In this case, an angle A2 formed by a horizontal line L3 connecting the rotation centers 711 and 731 of the two rollers to each other and a straight line L1/L2 connecting the rotation center 711/731 of each of the rollers to the center of the second front support part 8 will form 65 to 75 degrees.

In some implementations, a gap G1 between a most upper end of each of the first and second rollers 71 and 73 and a most lower end of the circumferential surface of the front cover 22 may be preferably set greater than a gap G2 between the second front support part 8 and a most upper end of the circumferential surface of the front cover 22. Namely, a gap G3 between the roller's circumferential surface and the front cover's circumferential surface is preferably set smaller than the gap G2 between the second front support part 8 and the most upper end of the circumferential surface of the front cover.

Thus, when the drum vibrates, if the two rollers 71 and 73 can restrict the vibration of the drum earlier than the second front support part 8, it is able to minimize an effect that the rotation center of the drum vibrates along a width direction (i.e., Y-axis direction) of the support body 121. If the drum rotates while receiving laundry inside, vibration is generated from the drum. Regarding such vibration of the drum, vibration facing a direction (i.e., −Z-axis direction) in which a bottom end of the support body is located and vibration facing the width direction (i.e., Y-axis direction) of the support body are usually greater than vibration facing a direction (+Z-axis direction) in which a top end of the support body is located. Therefore, if the first front support part 7 and the second front support part 8 are configured as described above, vibration generated in the early stage of rotation of the drum may be effectively attenuated.

Figure 13A:
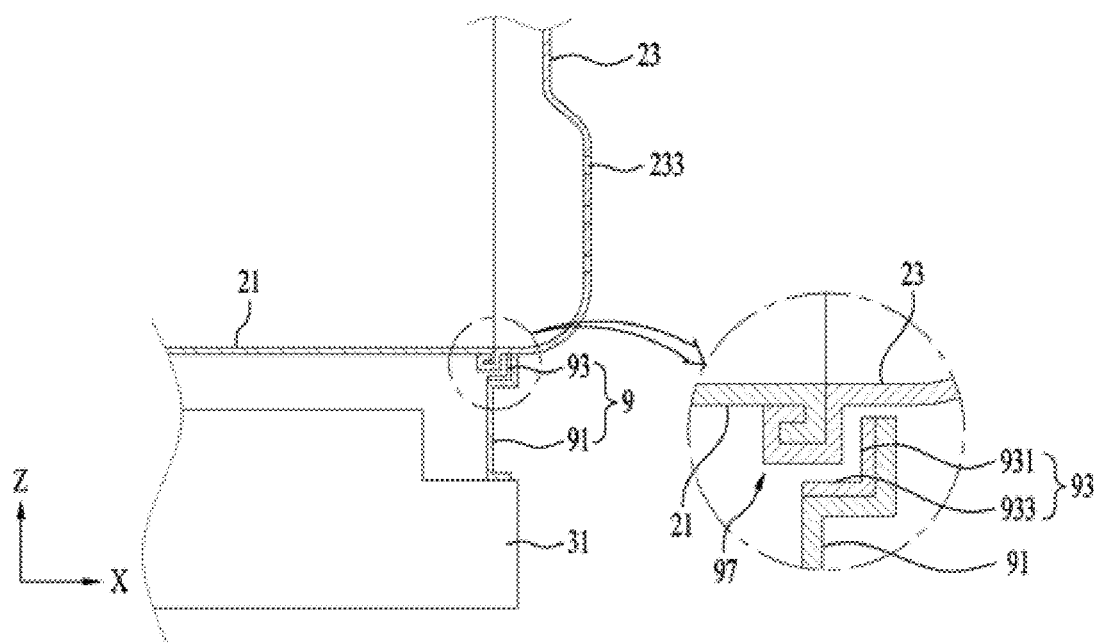
FIGS. 13A and 13B are diagrams showing one example of a rear support part.
Figure 13B:
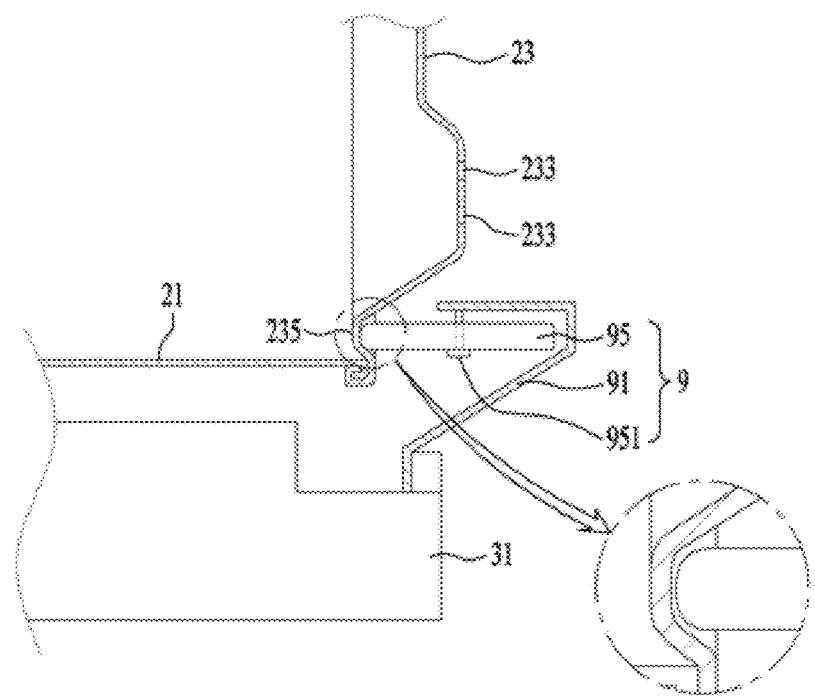

FIGS. 13A and 13B shows an example of the rear support part 9. As described above, the rear support part 9 is a means for at least one of a range in which the rear cover 23 can move toward the fixed panel 151 and a range in which the rear cover 23 can move toward the base panel 17.

Although the rear support part 9 shown in FIGS. 13A and 13B is illustrated as fixed to the exhaust duct 31, the rear support part 9 may be fixed to the base panel 17, the fixed panel 12, or both of the base panel and the fixed panel. For clarity and convenience, the following description will be made based on a case that the rear support part 9 is fixed to the exhaust duct 31.

The rear support part 9 of FIG. 13A includes a rear support frame 91 fixed to the exhaust duct 31 and a seat part 93 provided to the rear support frame 91 to limit at least one of a backward displacement made by the rear cover 23 moving toward the fixed panel 151 and a downward displacement made by the rear cover 23 moving toward the base panel 17.

The seat part 93 may be configured to support a coupling surface of the rear cover 23. In this case, the seat part 93 is preferably configured to correspond to a shape of the coupling part 97 of the drum body 21 and the rear cover 23.

Namely, if the coupling part 97 of the drum body 21 and the rear cover 23 is formed by seaming (i.e., an assembly method of coupling the drum body and the rear cover together by folding one end of the drum body and an edge of the rear cover together), an L-shaped edge will be formed in the coupling part 97. The seat part 93 may include a first seat surface 931 fixed to the rear support frame 91 and extended along the height direction (+Z-axis direction) of the drum and a second seat surface extended from the rear support frame 91 toward a direction (−axis direction) having the support panel located therein. The first seat surface 931 may be configured to limit the backward displacement by being located in a space between a rear surface (i.e., a surface facing the fixed panel) of the coupling part 97 and the fixed panel 151, and the second seat surface 933 may be configured to limit the downward displacement by being located in a space between a bottom end of the coupling part 97 and the base panel 17.

The first seat surface 931 may be configured to maintain a state of contacting with the coupling part 97. Alternatively, the first seat surface 931 may be configured to contact with the coupling part 97 only if a displacement over a preset reference backward displacement occurs in the drum.

Likewise, the second seat surface 933 may be configured to maintain a state of contacting with the coupling part 97. Alternatively, the second seat surface 933 may be configured to contact with the coupling part 97 only if a displacement over a preset reference downward displacement occurs in the drum.

If the rear cover 23 and the seat part 93 are configured to contact with each other, the seat part 93 may include a felt to reduce a frictional force working on the drum (i.e., to reduce a load on the motor).

The rear support part 9 of FIG. 13B includes a rear support frame 91 fixed to the exhaust duct 31 and a rear roller 95 rotatably fixed to the rear support frame 91 to contact with the rear cover 23. The rear roller 95 is rotatably fixed to a free end of the rear support frame 91 via a roller shaft 951.

A roller receiving recess 235 providing a space, in which a portion of the rear roller 95 is inserted, may be further provided to the rear cover 23. The roller receiving recess 235 may include a recess configured in a manner that a surface of the rear cover 23 is bent toward the front cover 22. The roller receiving recess 235 may be configured to form a circle that encloses the center (i.e., the rotation center of the drum) of the rear cover 23.

The rear roller 95 may be configured to maintain a state of contacting with the rear cover 23. Alternatively, the rear roller 95 may be configured to contact with the rear cover 23 only if a displacement over a preset reference downward displacement occurs in the drum.

The front support part 7 and 8 and the rear support part 9 described above can minimize the effect that the drum entrance 221 moves in directions (e.g., −X-axis direction, +Z-axis direction, −Z-axis direction) of being separated from the drum connecting body. Hence, the laundry treating apparatus 100 can minimize the leakage of the air supplied to the drum and the problem of the laundry stuck between the drum and the support panel 121.

If the problem of the laundry stuck between the drum and the support panel can be minimized, it means that the load working on the drive part can be minimized, which means that the rpm and rotating direction of the drum can be controlled via the motor generating small torque.

Although the aforementioned laundry treating apparatus 100 is described based on a case of including a circulation-type drying system, it is applicable to an exhaust-type drying system. The circulation-type drying system means a drying system of sequentially executing dehumidification and heating of air discharged from the drum 2 and then resupplying hot and dry air to the drum. The exhaust-type drying system means a drying system of heating external air, supplying the heated air to the drum 2, performing heat exchange, and exhausting the air, which is discharged from the drum 2, to an outside of the cabinet 1.

In case that the laundry treating apparatus is configured as the exhaust-type drying system, the supply part 3 may include an exhaust duct connecting the first outlet 128 and the second outlet 157 to each other, a supply duct suppling external air (e.g., air in the cabinet or air outside the cabinet) to the drum 2, and a heat exchange part heating the air having flown into the supply duct.

Although the aforementioned laundry treating apparatus 100 is described based on a case of including a circulation-type drying system, it is applicable to an exhaust-type drying system. The circulation-type drying system means a drying system of sequentially executing dehumidification and heating of air discharged from the drum 2 and then resupplying hot and dry air to the drum. The exhaust-type drying system means a drying system of heating external air, supplying the heated air to the drum 2, performing heat exchange, and exhausting the air, which is discharged from the drum 2, to an outside of the cabinet 1.

In case that the laundry treating apparatus is configured as the exhaust-type drying system, the supply part 3 may include an exhaust duct connecting the first outlet 128 and the second outlet 157 to each other, a supply duct suppling external air (e.g., air in the cabinet or air outside the cabinet) to the drum 2, and a heat exchange part heating the air having flown into the supply duct.

It will be apparent to those skilled in the art that the present disclosure may be embodied in other specific forms without departing from the spirit and essential characteristics of the disclosure. Thus, the above embodiments are to be considered in all respects as illustrative and not restrictive. The scope of the disclosure should be determined by reasonable interpretation of the appended claims and all change which comes within the equivalent scope of the disclosure are included in the scope of the disclosure.

What is claimed is:

1. An apparatus for treating laundry, comprising:
   a drum comprising:
      a drum body configured to receive the laundry,
      a front cover that defines a front side of the drum body, the front cover defining a drum entrance that passes through the front cover and is in communication with an inside of the drum body, and
      a rear cover that defines a rear side of the drum body;
   a fixed panel spaced apart from the rear cover of the drum;
   a housing that has a hollow cylindrical shape and is fixed to the fixed panel;
   a motor comprising a stator fixed to at least one of the fixed panel or the housing and a rotor configured to rotate relative to the stator;
   a ring gear fixed to an inside of the housing;
   a base located within the housing;
   a first shaft having a first end fixed to the rotor and a second end located within the housing;
   a driver gear located within the housing and fixed to the first shaft;
   a second shaft that is concentric with the first shaft, the second shaft having (i) a first end that is fixed to the rear cover of the drum and that passes through the fixed panel and (ii) a second end that is located within the housing and fixed to the base; and
   a driven gear comprising:
      a first body rotatably fixed to the base, a first gear defined at a circumferential surface of the first body and engaged with the driver gear, a second body fixed to the first body, a diameter of the second body being less than a diameter of the first body, and a second gear defined at a circumferential surface of the second body and engaged with the ring gear.

2. The apparatus of claim 1, wherein a diameter of the first gear is greater than a diameter of the driver gear, and wherein a diameter of the second gear is greater than the diameter of the driver gear and less than the diameter of the first gear.

3. The apparatus of claim 2, wherein the housing comprises:

a first housing that rotatably supports the first shaft; and a second housing that is fixed to the fixed panel and rotatably supports the second shaft, the second housing being coupled to the first housing, wherein a diameter of the second housing is less than a diameter of the first housing, and wherein the ring gear is fixed to a circumferential surface of the first housing.

4. The apparatus of claim 3, wherein the stator comprises a core fixed to at least one of the fixed panel or the housing, the core defining a core perforated hole that accommodates at least a portion of the housing.

5. The apparatus of claim 4, further comprising:

a first shaft support part that protrudes from the first housing toward the second housing, the first shaft support part defining a first shaft perforated hole that receives the first shaft; and a first shaft bearing that is located at the first shaft support part and rotatably supports the first shaft.

6. The apparatus of claim 5, further comprising:

a connecting shaft that is fixed to the base and defines a rotating axis of the driven gear; and a base cover that is fixed to the connecting shaft and receives the driven gear, the base cover defining a base cover perforated hole that receives an end of the first shaft support part.

7. The apparatus of claim 5, wherein the first shaft bearing comprises a first bearing and a second bearing that are arranged along a length direction of the first shaft.

8. The apparatus of claim 7, further comprising a second shaft bearing that is located at the second housing and rotatably supports the second shaft.

9. The apparatus of claim 2, wherein the housing comprises:

a first housing that rotatably supports the first shaft; and a second housing that is fixed to the fixed panel and rotatably supports the second shaft, the second housing being coupled to the first housing, wherein a diameter of the second housing is less than a diameter of the first housing, and wherein the ring gear is fixed to a circumferential surface of the second housing.

10. The apparatus of claim 1, further comprising:

a front panel that defines an entrance;

a door configured to open and close the entrance;

a support panel that is located between the front panel and the front cover, the support panel defining a support panel perforated hole;

a drum connecting body that connects the support panel perforated hole to the drum entrance;

a panel connecting body that connects the support panel perforated hole to the entrance, the panel connecting body defining a first outlet;

an exhaust duct that connects the first outlet to a second outlet defined at the fixed panel;

a supply duct configured to supply external air to the drum; and a heat exchanger configured to heat the external air received in the supply duct.

11. The apparatus of claim 1, further comprising:

a front panel that defines an entrance;

a door configured to open and close the entrance;

a support panel located between the front panel and the front cover, the support panel defining a support panel perforated hole;

a drum connecting body that connects the support panel perforated hole to the drum entrance;

a panel connecting body that connects the support panel perforated hole to the entrance, the panel connecting body defining a first outlet;

an exhaust duct that connects the first outlet to a second outlet defined at the fixed panel; and a heat exchanger configured to dehumidify and heat air in the exhaust duct, wherein the fixed panel further defines a panel inlet, and the rear cover defines an air inlet comprising a plurality of holes arranged along a ring shape, and wherein the apparatus further comprises:

a supply duct configured to guide air discharged from the second outlet to the panel inlet, and a flow path forming part that has a ring shape surrounding the air inlet of the rear cover, that is fixed to the fixed panel, and that is configured to guide air discharged from the panel inlet to the air inlet of the rear cover.

12. The apparatus of claim 11, further comprising a damper that has a ring shape, that is located at the drum entrance or an end of the drum connecting body, and that connects the end of the drum connecting body to an edge of the drum entrance.

13. The apparatus of claim 12, wherein the damper comprises felt.

14. The apparatus of claim 11, wherein the fixed panel is recessed toward the rear cover to thereby define a drive part installation recess, wherein the fixed panel defines a fixed panel perforated hole in the drive part installation recess, the second shaft passing through the fixed panel perforated hole, wherein the apparatus further comprises a drive part bracket located within the drive part installation recess and fixed to the fixed panel, and wherein the housing is fixed to the drive part bracket.

15. The apparatus of claim 14, further comprising a sealing part that is located at the drive part bracket or the fixed panel and covers the fixed panel perforated hole.

* * * * *